US012583785B2

(12) United States Patent
Ding et al.

(10) Patent No.: US 12,583,785 B2
(45) Date of Patent: Mar. 24, 2026

(54) ADVANCED OXIDATION PROTECTION SYSTEM WITH BROAD TEMPERATURE RANGE CAPABILITY

(71) Applicant: Goodrich Corporation, Charlotte, NC (US)

(72) Inventors: Zhongfen Ding, South Windsor, CT (US); Steven Poteet, Lake Forest, CA (US); John S. Linck, Pueblo, CO (US); Xia Tang, West Hartford, CT (US); Richard Wesley Jackson, III, Mystic, CT (US); Michael Miller, Glastonbury, CT (US); Virginia E. Collier, Fountain, CO (US); Hans L Lehermeier, Pueblo West, CO (US)

(73) Assignee: GOODRICH CORPORATION, Charlotte, NC (US)

( * ) Notice: Subject to any disclaimer, the term of this patent is extended or adjusted under 35 U.S.C. 154(b) by 311 days.

(21) Appl. No.: 18/186,785

(22) Filed: Mar. 20, 2023

(65) Prior Publication Data

US 2024/0317635 A1 Sep. 26, 2024

(51) Int. Cl.
C04B 41/86 (2006.01)
C03C 8/08 (2006.01)
(Continued)

(52) U.S. Cl.
CPC .................. C03C 8/22 (2013.01); C03C 8/08 (2013.01); C03C 8/14 (2013.01); C04B 35/83 (2013.01);
(Continued)

(58) Field of Classification Search
CPC ............ C04B 41/4539; C04B 41/5022; C04B 41/522; C04B 41/86; C04B 41/89
See application file for complete search history.

(56) References Cited

U.S. PATENT DOCUMENTS

| 2,685,539 A | 8/1954 | Woodburn, Jr. et al. |
| 2,685,540 A | 8/1954 | Woodburn, Jr. et al. |
| | (Continued) | |

FOREIGN PATENT DOCUMENTS

| CN | 1046517 | 10/1990 |
| CN | 101233341 | 7/2008 |
| | (Continued) | |

OTHER PUBLICATIONS

USPTO, Advisory Action dated Apr. 7, 2021 in U.S. Appl. No. 16/666,809.

(Continued)

*Primary Examiner* — Nathan H Empie
(74) *Attorney, Agent, or Firm* — SNELL & WILMER L.L.P.

(57) ABSTRACT

A method for forming an oxidation protection system on a carbon-carbon composite structure can comprise applying a boron slurry to the carbon-carbon composite structure, wherein the boron slurry comprises a boron compound, a first glass mixture, a first glass former, a first glass modifier, and a first carrier fluid, the first glass mixture including a first glass compound and a second glass compound, the first glass compound having a first viscosity-temperature profile that is at least one order of magnitude below a second viscosity-temperature profile of the second glass compound; applying a silicon slurry to the carbon-carbon composite structure, wherein the silicon slurry comprises a silicon compound, a third glass compound, a second glass former, a second glass modifier, and a second carrier fluid; and heating the carbon-carbon composite structure.

8 Claims, 6 Drawing Sheets

400

| Protective Layer 408 |
| :---: |
| Main Layer 406 |
| Barrier Layer 404 |
| Composite Structure 402 |

(51) Int. Cl.

| | |
|---|---|
| *C03C 8/14* | (2006.01) |
| *C03C 8/22* | (2006.01) |
| *C04B 35/83* | (2006.01) |
| *C04B 41/00* | (2006.01) |
| *C04B 41/45* | (2006.01) |
| *C04B 41/50* | (2006.01) |
| *C04B 41/52* | (2006.01) |
| *C04B 41/89* | (2006.01) |

(52) U.S. Cl.
CPC ...... *C04B 41/0072* (2013.01); *C04B 41/4539* (2013.01); *C04B 41/5022* (2013.01); *C04B 41/522* (2013.01); *C04B 41/86* (2013.01); *C04B 41/89* (2013.01); *C03C 2209/00* (2013.01); *C04B 2235/422* (2013.01); *C04B 2235/5248* (2013.01); *F16D 2200/0039* (2013.01); *F16D 2200/0052* (2013.01); *F16D 2200/0078* (2013.01); *F16D 2250/0046* (2013.01)

(56) References Cited

U.S. PATENT DOCUMENTS

| | | |
|---|---|---|
| 2,685,541 A | 8/1954 | Woodburn, Jr. et al. |
| 2,685,542 A | 8/1954 | Woodburn, Jr. et al. |
| 2,989,153 A | 6/1961 | Boulet et al. |
| 3,342,627 A | 9/1967 | Paxton et al. |
| 3,510,347 A | 5/1970 | Strater |
| 3,692,150 A | 9/1972 | Ruppe, Jr. |
| 3,713,882 A | 1/1973 | DeBrunner et al. |
| 3,794,509 A | 2/1974 | Trauger et al. |
| 3,972,395 A | 8/1976 | Jannasch et al. |
| 4,290,510 A | 9/1981 | Warren |
| 4,330,572 A | 5/1982 | Frosch et al. |
| 4,332,856 A | 6/1982 | Hsu |
| 4,425,407 A | 1/1984 | Galasso et al. |
| 4,439,491 A | 3/1984 | Wilson |
| 4,454,193 A | 6/1984 | Block |
| 4,471,023 A | 9/1984 | Shuford |
| 4,500,602 A | 2/1985 | Patten et al. |
| 4,548,957 A | 10/1985 | Hucke |
| 4,567,103 A | 1/1986 | Sara |
| 4,599,256 A | 7/1986 | Vasilos |
| 4,617,232 A | 10/1986 | Chandler et al. |
| 4,621,017 A | 11/1986 | Chandler et al. |
| 4,663,060 A | 5/1987 | Holinski |
| 4,702,960 A | 10/1987 | Ogman |
| 4,711,666 A | 12/1987 | Chapman et al. |
| 4,726,995 A | 2/1988 | Chiu |
| 4,760,900 A | 8/1988 | Shima et al. |
| 4,808,558 A | 2/1989 | Park et al. |
| 4,837,073 A | 6/1989 | McAllister et al. |
| 4,863,001 A | 9/1989 | Edmisten |
| 4,892,790 A | 1/1990 | Gray |
| 4,958,998 A | 9/1990 | Yamauchi et al. |
| 4,960,817 A | 10/1990 | Spadafora |
| 5,073,454 A | 12/1991 | Graham |
| 5,077,130 A | 12/1991 | Okuyama et al. |
| 5,094,901 A | 3/1992 | Gray |
| 5,102,698 A | 4/1992 | Cavalier et al. |
| 5,153,070 A | 10/1992 | Andrus et al. |
| 5,179,048 A | 1/1993 | Niebylski et al. |
| 5,198,152 A | 3/1993 | Liimatta et al. |
| 5,215,563 A | 6/1993 | LaCourse et al. |
| 5,224,572 A | 7/1993 | Smolen et al. |
| 5,242,746 A | 9/1993 | Bommier et al. |
| 5,256,448 A | 10/1993 | De Castro |
| 5,273,819 A | 12/1993 | Jex |
| 5,298,311 A | 3/1994 | Bentson et al. |
| 5,324,541 A | 6/1994 | Shuford |
| 5,352,494 A | 10/1994 | Rousseau |
| 5,360,638 A | 11/1994 | Lequertier |
| 5,401,440 A | 3/1995 | Stover et al. |
| 5,420,085 A | 5/1995 | Newkirk et al. |
| 5,427,823 A | 6/1995 | Varshney et al. |
| 5,439,080 A | 8/1995 | Haneda et al. |
| 5,480,676 A | 1/1996 | Sonuparlak et al. |
| 5,501,306 A | 3/1996 | Martino |
| 5,518,683 A | 5/1996 | Taylor et al. |
| 5,518,816 A | 5/1996 | Shuford |
| 5,536,574 A | 7/1996 | Carter |
| 5,622,751 A | 4/1997 | Thebault et al. |
| 5,629,101 A | 5/1997 | Watremez |
| 5,643,663 A | 7/1997 | Bommier et al. |
| 5,682,596 A | 10/1997 | Taylor et al. |
| 5,686,144 A | 11/1997 | Thebault et al. |
| 5,714,244 A | 2/1998 | Delaval et al. |
| 5,725,955 A | 3/1998 | Tawil et al. |
| 5,759,622 A | 6/1998 | Stover |
| 5,856,015 A | 1/1999 | Buchanan |
| 5,871,820 A | 2/1999 | Hasz et al. |
| 5,878,843 A | 3/1999 | Saum |
| 5,878,849 A | 3/1999 | Prunier, Jr. et al. |
| 5,901,818 A | 5/1999 | Martino |
| 5,958,846 A | 9/1999 | Geringer |
| 5,962,103 A | 10/1999 | Luthra et al. |
| 5,965,266 A | 10/1999 | Goujard et al. |
| 5,971,113 A | 10/1999 | Kesavan et al. |
| 5,981,072 A | 11/1999 | Mercuri et al. |
| 6,016,450 A | 1/2000 | Crock |
| 6,036,762 A | 3/2000 | Sambasivan |
| 6,071,603 A | 6/2000 | Sakai et al. |
| 6,071,615 A | 6/2000 | Solow et al. |
| 6,225,248 B1 | 5/2001 | Leiser et al. |
| 6,228,453 B1 | 5/2001 | Fareed et al. |
| 6,256,187 B1 | 7/2001 | Matsunaga et al. |
| 6,331,362 B1 | 12/2001 | Dupel et al. |
| 6,346,331 B2 | 2/2002 | Harvey et al. |
| 6,460,374 B2 | 10/2002 | Sakai et al. |
| 6,461,415 B1 | 10/2002 | Sambasivan et al. |
| 6,497,307 B1 | 12/2002 | Schoo et al. |
| 6,551,701 B1 | 4/2003 | Nohr et al. |
| 6,551,709 B1 | 4/2003 | Stover |
| 6,555,173 B1 | 4/2003 | Forsythe et al. |
| 6,632,762 B1 | 10/2003 | Zaykoski et al. |
| 6,668,984 B2 | 12/2003 | Gray |
| 6,676,887 B2 | 1/2004 | Lafdi |
| 6,737,120 B1 | 5/2004 | Golecki |
| 6,740,408 B2 | 5/2004 | Thebault |
| 6,759,117 B2 | 7/2004 | Bauer et al. |
| 6,884,467 B2 | 4/2005 | Walker et al. |
| 6,896,968 B2 | 5/2005 | Golecki |
| 6,913,821 B2 | 7/2005 | Golecki et al. |
| 6,969,422 B2 | 11/2005 | Mazany et al. |
| 7,011,888 B2 | 3/2006 | Bauer et al. |
| 7,118,805 B2 | 10/2006 | Walker et al. |
| 7,160,618 B2 | 1/2007 | Walker et al. |
| 7,311,944 B2 | 12/2007 | Sambasivan et al. |
| 7,501,181 B2 | 3/2009 | Walker et al. |
| 7,641,941 B2 | 1/2010 | Mazany et al. |
| 7,732,358 B2 | 6/2010 | Mazany et al. |
| 7,785,712 B2 | 8/2010 | Miller et al. |
| 7,938,877 B2 | 5/2011 | Liu et al. |
| 7,968,192 B2 | 6/2011 | Mazany et al. |
| 8,021,474 B2 | 9/2011 | Mazany et al. |
| 8,021,758 B2 | 9/2011 | Sambasivan et al. |
| 8,124,184 B2 | 2/2012 | Sambasivan et al. |
| 8,137,802 B1 | 3/2012 | Loehman et al. |
| 8,322,754 B2 | 12/2012 | Carcagno et al. |
| 8,962,083 B2 | 2/2015 | Murphy |
| 9,126,873 B2 | 9/2015 | Diss et al. |
| 9,388,087 B2 | 7/2016 | Don |
| 9,657,409 B2 | 5/2017 | Sandgren et al. |
| 9,758,678 B2 | 9/2017 | Nicolaus et al. |
| 9,790,133 B2 | 10/2017 | Mazany |
| 10,465,285 B2 | 11/2019 | Mazany |
| 10,508,206 B2 | 12/2019 | Poteet |
| 10,526,253 B2 | 1/2020 | Poteet |
| 10,689,290 B2 | 6/2020 | Mazany |
| 10,767,059 B2 | 9/2020 | Poteet |
| 10,899,673 B2 | 1/2021 | Sniezewski et al. |
| 10,941,486 B2 | 3/2021 | Mazany |
| 11,001,533 B2 | 5/2021 | Mazany et al. |

(56) References Cited

U.S. PATENT DOCUMENTS

| | | | |
|---|---|---|---|
| 11,046,619 B2 | 6/2021 | Poteet | |
| 11,072,565 B2 | 7/2021 | Weaver et al. | |
| 11,091,402 B2 | 8/2021 | Poteet | |
| 11,453,619 B2 | 9/2022 | Poteet | |
| 11,472,749 B2 | 10/2022 | Poteet et al. | |
| 11,634,213 B2 | 4/2023 | Poteet et al. | |
| 12,065,380 B2 * | 8/2024 | Khan | |
| 12,319,622 B2 * | 6/2025 | Poteet | C04B 41/52 |
| 2002/0058576 A1 | 5/2002 | Mazany et al. | |
| 2002/0096407 A1 | 7/2002 | Gray | |
| 2002/0123592 A1 | 9/2002 | Zhang | |
| 2003/0021975 A1 | 1/2003 | Martin | |
| 2003/0143436 A1 | 7/2003 | Forsythe et al. | |
| 2003/0194574 A1 | 10/2003 | Thebault et al. | |
| 2004/0038032 A1 | 2/2004 | Walker et al. | |
| 2004/0038043 A1 | 2/2004 | Golecki et al. | |
| 2004/0062009 A1 | 4/2004 | Osanai et al. | |
| 2004/0076806 A1 | 4/2004 | Miyanaga et al. | |
| 2004/0213906 A1 | 10/2004 | Mazany et al. | |
| 2005/0022698 A1 | 2/2005 | Mazany et al. | |
| 2005/0127146 A1 | 6/2005 | Chaumat et al. | |
| 2006/0159909 A1 | 7/2006 | Asian | |
| 2006/0163605 A1 | 7/2006 | Miyahara | |
| 2007/0026153 A1 | 2/2007 | Nicolaus et al. | |
| 2007/0065676 A1 | 3/2007 | Bacalski et al. | |
| 2007/0154712 A1 | 7/2007 | Mazany et al. | |
| 2008/0058193 A1 | 3/2008 | Drake et al. | |
| 2008/0142148 A1 | 6/2008 | Mazany | |
| 2008/0311301 A1 | 12/2008 | Diss et al. | |
| 2010/0044730 A1 | 2/2010 | Kwon et al. | |
| 2010/0266770 A1 | 10/2010 | Mazany et al. | |
| 2011/0311804 A1 * | 12/2011 | Diss | F02K 9/974 |
| | | | 428/448 |
| 2012/0025434 A1 | 2/2012 | Demey et al. | |
| 2013/0022826 A1 | 1/2013 | Kmetz et al. | |
| 2014/0196502 A1 | 7/2014 | Masuda et al. | |
| 2014/0227511 A1 | 8/2014 | Mazany | |
| 2014/0349016 A1 | 11/2014 | Don | |
| 2015/0183998 A1 | 7/2015 | Belov et al. | |
| 2015/0291805 A1 | 10/2015 | Nicolaus et al. | |
| 2015/0362029 A1 | 12/2015 | Edwards et al. | |
| 2016/0122231 A1 | 5/2016 | Ishihara et al. | |
| 2016/0280585 A1 | 9/2016 | Mazany | |
| 2016/0280612 A1 * | 9/2016 | Mazany | F16D 69/023 |
| 2017/0036945 A1 | 2/2017 | Ishihara et al. | |
| 2017/0267595 A1 | 9/2017 | Mazany | |
| 2017/0342555 A1 | 11/2017 | Mazany | |
| 2017/0349825 A1 | 12/2017 | Mazany | |
| 2017/0369713 A1 | 12/2017 | Poteet | |
| 2017/0369714 A1 | 12/2017 | Nicolaus et al. | |
| 2018/0044537 A1 | 2/2018 | Poteet | |
| 2019/0055393 A1 | 2/2019 | Tsuji | |
| 2019/0233324 A1 | 8/2019 | Poteet et al. | |
| 2020/0010359 A1 | 1/2020 | Poteet et al. | |
| 2020/0148340 A1 | 5/2020 | Poteet et al. | |
| 2020/0148891 A1 | 5/2020 | Grorud | |
| 2021/0087102 A1 | 3/2021 | Simard et al. | |
| 2021/0094887 A1 | 4/2021 | Poteet et al. | |
| 2021/0198159 A1 * | 7/2021 | Poteet | C04B 41/52 |
| 2022/0356123 A1 | 11/2022 | Khan | |
| 2023/0150884 A1 | 5/2023 | Khan et al. | |
| 2023/0219859 A1 | 7/2023 | Nable et al. | |
| 2023/0257313 A1 * | 8/2023 | Nable | C04B 35/83 |
| | | | 428/408 |
| 2024/0318695 A1 * | 9/2024 | Ding | C04B 41/507 |
| 2024/0391835 A1 | 11/2024 | Khan et al. | |

FOREIGN PATENT DOCUMENTS

| | | |
|---|---|---|
| CN | 101328077 | 12/2008 |
| CN | 101898906 | 12/2010 |
| CN | 102515850 | 6/2012 |
| CN | 101712563 | 9/2012 |
| CN | 103274760 | 9/2013 |
| CN | 105237039 | 11/2017 |
| CN | 105646007 | 4/2018 |
| CN | 107935634 | 4/2018 |
| CN | 107986807 | 10/2020 |
| CN | 113831155 | 12/2021 |
| CN | 114315390 | 4/2022 |
| DE | 69830510 | 3/2006 |
| EP | 200568 | 11/1986 |
| EP | 1043290 | 10/2000 |
| EP | 1693262 | 8/2006 |
| EP | 1834937 | 9/2007 |
| EP | 1840264 | 10/2007 |
| EP | 1968914 | 7/2010 |
| EP | 2684752 | 1/2014 |
| EP | 2767529 | 8/2014 |
| EP | 2774900 | 9/2014 |
| EP | 2930162 | 10/2015 |
| EP | 3072865 | 9/2016 |
| EP | 3072866 | 9/2016 |
| EP | 3222602 | 9/2017 |
| EP | 3255027 | 12/2017 |
| EP | 3282038 | 2/2018 |
| EP | 3184228 | 7/2019 |
| EP | 3530637 | 8/2019 |
| EP | 3590910 | 1/2020 |
| EP | 3702342 | 9/2020 |
| EP | 3842404 | 6/2021 |
| EP | 4086234 | 11/2022 |
| EP | 4227286 | 8/2023 |
| EP | 4279472 | 11/2023 |
| GB | 2468378 | 9/2010 |
| JP | S56105442 | 8/1981 |
| JP | S6011353 A | 1/1985 |
| JP | H0812477 | 1/1996 |
| JP | 09301786 | 11/1997 |
| JP | 2006036551 | 2/2006 |
| KR | 20050022947 | 3/2005 |
| KR | 20090035732 | 4/2009 |
| WO | 9742135 | 11/1997 |
| WO | 0051950 | 9/2000 |
| WO | 03084899 | 10/2003 |
| WO | 2007078419 | 7/2007 |
| WO | 2010001021 | 1/2010 |
| WO | 2014035413 | 3/2014 |
| WO | 2015169024 | 11/2015 |

OTHER PUBLICATIONS

USPTO, Notice of Allowance dated Apr. 15, 2021 in U.S. Appl. No. 16/668,852.

U.S. Appl. No. 17/308,776, filed May 5, 2021 titled "High Temperature Oxidation Protection for Carbon-Carbon Composites," 41 pages.

European Patent Office, European Search Report dated May 10, 2021 in Application No. 20216996.7.

USPTO, Corrected Notice of Allowance dated Jun. 4, 2021 in U.S. Appl. No. 16/102,100.

European Patent Office, European Office Action dated Jul. 7, 2021 in Application No. 17183478.1.

USPTO, Corrected Notice of Allowance dated Jun. 11, 2021 in U.S. Appl. No. 16/668,852.

USPTO, Notice of Allowance dated Jul. 12, 2021 in U.S. Appl. No. 16/666,809.

European Patent Office, European Office Action dated Oct. 22, 2021 in Application No. 19191306.0.

USPTO, Non-Final Office Action dated Nov. 18, 2021 in U.S. Appl. No. 15/076,348.

USPTO, Restriction/Election Requirement dated Dec. 1, 2021 in U.S. Appl. No. 16/190,817.

USPTO, Notice of Allowance dated Feb. 1, 2022 in U.S. Appl. No. 17/185,016.

U.S. Appl. No. 17/527,423, filed Nov. 16, 2021 entitled "High Temperature Oxidation Protection for Carbon-Carbon Composites," 41 pages.

USPTO, Supplemental Notice of Allowance dated Feb. 24, 2022 in U.S. Appl. No. 17/185,016.

(56) References Cited

OTHER PUBLICATIONS

USPTO, Pre-Interview First Office Action dated Mar. 21, 2022 in U.S. Appl. No. 16/029,134.

USPTO, Pre-Interview First Office Action dated Mar. 1, 2022 in U.S. Appl. No. 16/190,817.

U.S. Appl. No. 17/671,361, filed Feb. 14, 2022 entitled "Oxidation Protection With Improved Water Resistance for Composites," 38 pages.

Eckel, Zak C., et al. "Additive Manufacturing of Polymer-derived Ceramics". Science 351, (2016), vol. 351, p. 58-62. DOI: 10.1126/science.aad2688.

USPTO, First Action Interview Office Action dated May 9, 2022 in U.S. Appl. No. 16/029,134.

USPTO, Notice of Allowance dated May 25, 2022 in U.S. Appl. No. 17/330,163.

USPTO, Notice of Allowance dated Jul. 8, 2022 in U.S. Appl. No. 17/330,163.

USPTO, Notice of Allowance dated Jun. 29, 2022 in U.S. Appl. No. 17/378,207.

USPTO, First Action Interview Office Action dated Jun. 30, 2022 in U.S. Appl. No. 16/190,817.

USPTO, Corrected Notice of Allowance dated Jul. 19, 2022 in U.S. Appl. No. 17/378,207.

USPTO, Final Office Action dated Aug. 22, 2022 in U.S. Appl. No. 16/029,134.

USPTO, Corrected Notice of Allowance dated Aug. 31, 2022 in U.S. Appl. No. 17/330,163.

European Patent Office, European Search Report dated Sep. 23, 2022 in Application No. 22171665.7.

USPTO, Corrected Notice of Allowance dated Oct. 17, 2022 in U.S. Appl. No. 17/378,207.

USPTO, Notice of Allowance dated Dec. 21, 2022 in U.S. Appl. No. 16/190,817.

European Patent Office, European Office Action dated Aug. 18, 2022 in Application No. 17183478.1.

European Patent Office, European Office Action dated Nov. 24, 2022 in Application No. 19184523.9.

European Patent Office, European Office Action dated Jan. 26, 2023 in Application No. 19207148.8.

USPTO, Corrected Notice of Allowance dated Mar. 1, 2023 in U.S. Appl. No. 16/190,817.

European Patent Office, European Office Action dated Feb. 17, 2023 in Application No. 1718011.7.

USPTO, Requirement for Restriction dated Apr. 26, 2023 in U.S. Appl. No. 17/079,239.

USPTO, Non-Final Office Action dated Mar. 30, 2023 in U.S. Appl. No. 17/671,361.

European Patent Office, European Search Report dated Apr. 12, 2023 in Application No. 22207343.9.

European Patent Office, European Search Report dated May 23, 2023 in Application No. 23150808.6.

Chemical Abstracts, (Aug. 12, 1985), vol. 103, ISSN 0009-2258, XP000189303 [A] 1-15 * abstract *.

Buchanan F J, et al. "Particulate-containing glass sealents for carbon-carbon composites" Carbon, Elsevier Oxford, GB, vol. 33, No. 4, 1995, pp. 491-497.

USPTO, Non-Final Office Action dated Jul. 13, 2023 in U.S. Appl. No. 17/079,239.

European Patent Office, European Search Report dated Jul. 7, 2023 in Application No. 23156560.7.

USPTO, Final Office Action dated Sep. 28, 2023 in U.S. Appl. No. 17/671,361.

European Patent Office, European Office Action dated Sep. 1, 2023 in Application No. 19184523.9.

European Patent Office, European Search Report dated Sep. 19, 2023 in Application No. 23173619.0.

Pechentkovskaya L. E. et al., "Effect of the different crystal structures of boron nitride on its high-temperature stability in oxygen", Soviet Powder Metallurgy and Metal Ceramics, [Online] vol. 20, No. 7, Jul. 1981 (Jul. 1981), pp. 510-512, DOI: 10.1007/BF00800535, Retrieved from the Internet: url: https://link.springer.com/article/10.1007/BF00800535, [retrieved on Sep. 13, 2023].

USPTO, Examiner's Answer to Appeal Brief dated Sep. 7, 2023 in U.S. Appl. No. 16/029,134.

European Patent Office, European Search Report dated Nov. 20, 2023 in Application No. 23179864.6.

"Liu et al: ""Effect of Al2O3 addition on the microstructure and oxidation behavior of SiC coating prepared by pack cementation on C/C composites"", Ceramics International, Elsevier, Amsterdam, NL, vol. 47, No. 20, Jul. 13, 2021 (Jul. 13, 2021), pp. 29309-29319, XP086762324, ISSN: 0272-8842, DOI: 10.1016/J.CERAMINT.2021.07.096 [retrieved on Jul. 13, 2021]".

USPTO, Restriction/Election Requirement dated Dec. 15, 2023 in U.S. Appl. No. 17/308,776.

International Searching Authority, International Search Report and Written Opinion dated Apr. 20, 2005 in Application No. PCT/US2004/012222.

International Searching Authority, International Preliminary Report on Patentability dated Aug. 18, 2005 in Application No. PCT/US2004/012222.

International Searching Authority, International Search Report and Written Opinion dated Jul. 3, 2007 in Application No. PCT/US2006/043343.

European Patent Office, Office Action dated Jan. 4, 2008 in Application No. 04816727.4.

USPTO, Office Action dated Feb. 26, 2008 in U.S. Appl. No. 10/829,144.

International Searching Authority, International Preliminary Report on Patentability dated Mar. 12, 2008 in Application No. PCT/US2006/043343.

USPTO, Final Office Action dated Jul. 16, 2008 in U.S. Appl. No. 10/829,144.

USPTO, Office Action dated Oct. 24, 2008 in U.S. Appl. No. 10/829,144.

European Patent Office, Communication Pursuant to Article 94(3) EPC dated Oct. 28, 2008 in European Application No. 06837063.4.

USPTO, Restriction Requirement dated Feb. 5, 2009 in U.S. Appl. No. 11/315,592.

USPTO, Final Office Action dated Jan. 29, 2009 in U.S. Appl. No. 10/829,144.

European Patent Office, Communication Pursuant to Article 94(3) EPC dated Feb. 9, 2009 in European Application No. 06837063.4.

USPTO, Office Action dated May 29, 2009 in U.S. Appl. No. 10/829,144.

USPTO, Office Action dated Jun. 9, 2009 in U.S. Appl. No. 11/315,592.

USPTO, Notice of Allowance dated Oct. 1, 2009 in U.S. Appl. No. 10/829,144.

USPTO, Final Office Action dated Dec. 11, 2009 in U.S. Appl. No. 11/315,592.

European Patent Office, Communication under Rule 71(3) EPC dated Feb. 4, 2010 in European Application No. 06837063.4.

USPTO, Advisory Action dated Feb. 25, 2010 in U.S. Appl. No. 11/315,592.

USPTO, Office Action dated Apr. 1, 2010 in U.S. Appl. No. 11/315,592.

European Patent Office, Partial European Search Report dated Oct. 29, 2010 in European Application No. 10169627.6.

USPTO, Office Action dated Feb. 4, 2011 in U.S. Appl. No. 12/619,061.

USPTO, Office Action dated Feb. 22, 2011 in U.S. Appl. No. 12/829,178.

European Patent Office, Extended European Search Report dated May 4, 2011 in European Application No. 10169627.6.

USPTO, Final Office Action dated Aug. 19, 2011 in U.S. Appl. No. 12/829,178.

USPTO, Advisory Action dated Oct. 27, 2011 in U.S. Appl. No. 12/829,178.

U.S. Appl. No. 15/076,348, filed Mar. 21, 2016 titled "High Temperature Oxidation Protection for Composites," 42 pages.

U.S. Appl. No. 15/169,219, filed May 31, 2016 titled "High Temperature Oxidation Protection for Composites," 37 pages.

(56)        References Cited

OTHER PUBLICATIONS

U.S. Appl. No. 15/169,257, filed May 31, 2016 titled "High Temperature Oxidation Protection for Composites," 40 pages.
U.S. Appl. No. 15/174,537, filed Jun. 6, 2016 titled "Nanocomposite Coatings for Oxidation Protection for Composites," 44 pages.
U.S. Appl. No. 15/194,034, filed Jun. 27, 2016 titled "High Temperature Oxidation Protection for Composites," 49 pages.
U.S. Appl. No. 15/234,903, filed Aug. 11, 2016 titled "High Temperature Oxidation Protection for Composites," 41 pages.
U.S. Appl. No. 15/380,442, filed Dec. 15, 2016 titled "High Temperature Oxidation Protection for Composites," 41 pages.
European Patent Office, Extended European Search Report dated Jul. 26, 2016 in European Application No. 16161832.7.
USPTO, Restriction Requirement dated Nov. 7, 2016 in U.S. Appl. No. 14/671,637.
USPTO, Pre-Interview First Office Action dated Mar. 6, 2017 in U.S. Appl. No. 14/671,637.
USPTO, First Action Interview Office Action dated May 12, 2017 in U.S. Appl. No. 14/671,637.
USPTO, Restriction Requirement dated Jan. 5, 2018 in U.S. Appl. No. 15/076,348.
European Patent Office, Extended European Search Report dated Aug. 2, 2017 in European Application No. 17159538.2.
Rovner; "A Haven for Glass, Ceramics"; Science & Technology; May 24, 2004; pp. 33-39.
Air Products and Chemicals, Inc., "Complete Product Offering," 4 pages, retrieved from www.airproducts.com on Jun. 28, 2004.
Mckee, Chemistry and Physics of Carbon, vol. 16, P.L. Walker and P.A. Thrower eds., Marcel Dekker, 1981, p. 30-42.
Sosman, "The Common Refractory Oxides," The Journal of Industrial and Engineering Chemistry, vol. 8, No. 11, Nov. 1916, pp. 985-990.
Almatis Website, C-333, Accessed Feb. 8, 2011, p. 1.
Montedo et al., Crystallisation Kinetics of a B-Spodumene-Based Glass Ceramic, Advances in Materials Science and Engineering, pp. 1-9, Volume.
European Patent Office, Extended European Search Report dated Oct. 9, 2017 in European Application No. 17173709.1.
European Patent Office, Extended European Search Report dated Oct. 17, 2017 in European Application No. 17173707.5.
Sun Lee W et al., "Comparative study of thermally conductive fillers in underfill for the electronic components", Diamond and Related Materials, Elsevier Science Publishers, Amsterdam, NL, vol. 14, No. 10, Oct. 1, 2005 (Oct. 1, 2005), pp. 1647-1653.
Rockwood Lithium, Spodumene Concentrate SC 7.5 premium, Aug. 2015, pp. 1-2, The Lithium Company.
D.D.L. Chung: "Acid Aluminum Phosphate for the Binding and Coating of Materials", Journal of Materials Science, vol. 38, No. 13, 2003, pp. 2785-2791.
European Patent Office, Extended European Search Report dated Nov. 6, 2017 in European Application No. 17174481.6.
USPTO; Notice of Allowance dated Mar. 12, 2025 in U.S. Appl. No. 17/571,083.
USPTO; Notice of Allowance dated Mar. 12, 2025 in U.S. Appl. No. 17/747,816.
USPTO; Notice of Allowance dated Mar. 3, 2025 in U.S. Appl. No. 17/571,083.
USPTO; Notice of Allowance dated Mar. 7, 2025 in U.S. Appl. No. 17/308,776.
USPTO; Corrected Notice of Allowance dated Apr. 9, 2025 in U.S. Appl. No. 17/747,816.
USPTO, Non-Final Office Action dated Jul. 27, 2018 in U.S. Appl. No. 15/174,537.
Steven A. Poteet, et al., U.S. Appl. No. 16/029,134, filed Jul. 6, 2018 titled "High Temperature Oxidation Protection for Composites ," 43 pages.
Steven A. Poteet, et al., U.S. Appl. No. 15/886,671, filed Feb. 1, 2018 titled "High Temperature Oxidation Protection for Composites ," 45 pages.

European Patent Office, European Office Action date Jul. 16, 2018 in Application No. 17174481.6.
Steven A. Poteet, U.S. Appl. No. 16/102,100, filed Aug. 13, 2018 titled "High Temperature Oxidation Protection for Composites ," 47 pages.
USPTO, Notice of Allowance dated Aug. 24, 2018 in U.S. Appl. No. 14/671,637.
Anthony Mazany, U.S. Appl. No. 16/116,665, filed Aug. 29, 2018 titled " Formulations for Oxidation Protection of Composite Articles", 30 pages.
USPTO, Restriction/Election Requirement dated Aug. 30, 2018 in U.S. Appl. No. 15/169,219.
USPTO, Restriction/Election Requirement dated Aug. 30, 2018 in U.S. Appl. No. 15/169,257.
USPTO, Final Office Action dated Oct. 26, 2018 in U.S. Appl. No. 15/234,903.
USPTO, Final Office Action dated Nov. 5, 2018 in U.S. Appl. No. 15/076,348.
Steven A. Poteet, U.S. Appl. No. 16/190,817, filed Nov. 14, 2018 titled "High Temperature Oxidation Protection for Composites", 38 pages.
USPTO, Non-Final Office Action filed Dec. 19, 2018 in U.S. Appl. No. 15/169,219.
USPTO, Non-Final Office Action filed Dec. 19, 2018 in U.S. Appl. No. 15/169,257.
USPTO, Non-Final Office Action filed Dec. 21, 2018 in U.S. Appl. No. 15/194,034.
USPTO, Advisory Action filed Dec. 28, 2018 in U.S. Appl. No. 15/076,348.
USPTO, Advisory Action filed Jan. 17, 2019 in U.S. Appl. No. 15/234,903.
USPTO, Final Office Action filed Feb. 14, 2019 in U.S. Appl. No. 15/174,537.
USPTO, Non-Final Office Action filed Feb. 25, 2019 in U.S. Appl. No. 15/234,903.
USPTO, Non-Final Office Action dated Apr. 16, 2019 in U.S. Appl. No. 15/076,348.
USPTO, Notice of Allowance dated Apr. 3, 2019 in U.S. Appl. No. 15/169,257.
USPTO, Advisory Action dated May 17, 2019 in U.S. Appl. No. 15/174,537.
USPTO, Final Office Action dated May 15, 2019 in U.S. Appl. No. 15/194,034.
USPTO, Restriction/Election Requirement dated Apr. 5, 2019 in U.S. Appl. No. 15/380,442.
USPTO, Non-Final Office Action filed Jun. 7, 2019 in U.S. Appl. No. 15/174,537.
USPTO, Notice of Allowance dated Jun. 17, 2019 in U.S. Appl. No. 15/169,257.
European Patent Office, European Office Action date Jun. 21, 2019 in Application No. 19155021.9.
USPTO, Notice of Allowance filed Jun. 26, 2019 in U.S. Appl. No. 15/169,219.
USPTO, Pre-Interview First Office Action dated Jul. 26, 2019 in U.S. Appl. No. 15/380,442.
USPTO, Notice of Allowance dated Aug. 13, 2019 in U.S. Appl. No. 15/194,034.
European Patent Office, Communication pursuant to Article 94(3) dated Aug. 28, 2019 in Application No. 17173707.5.
USPTO, Final Office Action filed Aug. 30, 2019 in U.S. Appl. No. 15/234,903.
The National Academics Press, Committee on Advanced Fibers for High-Temperature Ceramic Composites, Ceramic Fibers and Coatings: Advanced Materials for the Twenty-First Century, Chapter 6: Interfacial Coatings, (1998), p. 1-48 (Year: 1998).
USPTO, Notice of Allowance dated Sep. 25, 2019 in U.S. Appl. No. 15/380,442.
USPTO, Supplemental Notice of Allowance filed Oct. 2, 2019 in U.S. Appl. No. 15/169,219.
Steven A. Poteet, U.S. Appl. No. 16/666,809, filed Oct. 29, 2019 titled "High Temperature Oxidation Protection for Composites ," 45 pages.

(56)        References Cited

OTHER PUBLICATIONS

USPTO, Advisory Action filed Nov. 20, 2019 in U.S. Appl. No. 15/234,903.
European Patent Office, European Search Report dated Nov. 25, 2019 in Application No. 19184523.9.
USPTO, Restriction/Election Requirement dated Dec. 13, 2019 in U.S. Appl. No. 15/886,671.
European Patent Office, European Search Report dated Dec. 13, 2019 in Application No. 19191306.0.
USPTO, Notice of Allowance dated Feb. 21, 2020 in U.S. Appl. No. 16/116,665.
European Patent Office, European Search Report dated Mar. 23, 2020 in Application No. 19207148.8.
USPTO, Pre-Interview First Office Action dated Apr. 17, 2020 in U.S. Appl. No. 15/886,671.
USPTO, Restriction/Election Requirement dated Apr. 30, 2020 in U.S. Appl. No. 16/029,134.
USPTO, Notice of Allowance filed May 1, 2020 in U.S. Appl. No. 15/234,903.
USPTO, Corrected Notice of Allowance dated May 28, 2020 in U.S. Appl. No. 16/116,665.
USPTO, First Action Interview Office Action dated Jun. 4, 2020 in U.S. Appl. No. 15/886,671.
USPTO, Corrected Notice of Allowance filed Jul. 9, 2020 in U.S. Appl. No. 15/234,903.
USPTO, Corrected Notice of Allowance filed Aug. 7, 2020 in U.S. Appl. No. 15/234,903.
USPTO, Restriction/Election Requirement filed Jul. 14, 2020 in U.S. Appl. No. 16/102,100.
USPTO; Corrected Notice of Allowance dated Mar. 12, 2025 in U.S. Appl. No. 17/571,083.
USPTO; Corrected Notice of Allowance dated May 7, 2025 in U.S. Appl. No. 17/571,083.
USPTO; Notice of Allowance dated May 19, 2025 in U.S. Appl. No. 18/120,785.
USPTO; Non-Final Office Action dated May 15, 2025 in U.S. Appl. No. 18/186,821.
USPTO; Requirement for Restriction/ Election dated May 14, 2025 in U.S. Appl. No. 18/186,844.
USPTO; Final Office Action dated Apr. 30, 2025 in U.S. Appl. No. 18/765,864.
USPTO; Corrected Notice of Allowance dated Apr. 30, 2025 in U.S. Appl. No. 17/308,776.
USPTO; Notice of Allowance dated Feb. 13, 2025 in U.S. Appl. No. 17/747,816.
USPTO; Notice of Allowance dated Feb. 5, 2025 in U.S. Appl. No. 17/747,816.
USPTO; Non-Final Office Action dated Feb. 20, 2025 in U.S. Appl. No. 18/186,821.
USPTO; Notice of Allowance dated Jun. 3, 2025 in U.S. Appl. No. 18/765,864.
USPTO; Final Office Action dated Jun. 13, 2025 in U.S. Appl. No. 17/671,361.
European Patent Office, European Office Action dated May 27, 2025 in Application No. 19207148.8.
USPTO; Non-Final Office Action dated Nov. 18, 2024 in U.S. Appl. No. 17/671,361.
USPTO; Non-Final Office Action dated Nov. 7, 2024 in U.S. Appl. No. 17/747,816.
USPTO, Final Office Action dated Jan. 17, 2018 in U.S. Appl. No. 14/671,637.
European Patent Office, Communication Pursuant to Article 94(3) dated Jan. 3, 2018 in European Application No. 16161832.7.
European Patent Office, Extended European Search Report dated Nov. 20, 2017 in European Application No. 17175809.7.
European Patent Office, Extended European Search Report dated Nov. 20, 2017 in European Application No. 17178011.7.
European Patent Office, Partial European Search Report dated Jan. 3, 2018 in European Application No. 17183478.1.

USPTO, Advisory Action dated Mar. 30, 2018 in U.S. Appl. No. 14/671,637.
USPTO, Non-Final Office Action dated May 1, 2018 in U.S. Appl. No. 15/076,348.
USPTO, Restriction/Election Requirement dated May 24, 2018 in U.S. Appl. No. 15/174,537.
USPTO, Non-Final Office Action dated Mar. 28, 2018 in U.S. Appl. No. 15/234,903.
European Patent Office, European Search Report dated Apr. 11, 2018 in European Application No. 17183478.1-1103.
European Patent Office, European Search Report dated Apr. 13, 2018 in European Application No. 17207767.9-1106.
USPTO, Restriction/Election Requirement dated Jun. 19, 2018 in U.S. Appl. No. 15/194,034.
USPTO, Notice of Allowance dated Jun. 5, 2018 in U.S. Appl. No. 14/671,637.
USPTO, Corrected Notice of Allowance dated Jun. 22, 2018 in U.S. Appl. No. 14/671,637.
USPTO, Final Office Action dated Sep. 9, 2020 in U.S. Appl. No. 15/886,671.
USPTO, Non-Final Office Action dated Oct. 29, 2020 in U.S. Appl. No. 16/666,809.
European Patent Office, European Office Action dated Oct. 22, 2020 in Application No. 17173709.1.
USPTO, Advisory Action dated Nov. 17, 2020 in U.S. Appl. No. 15/886,671.
USPTO, Non-Final Office Action filed Nov. 17, 2020 in U.S. Appl. No. 16/102,100.
USPTO, Notice of Allowance dated Dec. 7, 2020 in U.S. Appl. No. 16/589,368.
European Patent Office, European Office Action dated Nov. 19, 2020 in Application No. 17178011.7.
USPTO, Notice of Allowance dated Jan. 1, 2021 in U.S. Appl. No. 16/453,593.
USPTO, Supplemental Notice of Allowance dated Feb. 9, 2021 in U.S. Appl. No. 16/589,368.
USPTO, Supplemental Notice of Allowance dated Feb. 9, 2021 in U.S. Appl. No. 16/453,593.
USPTO, Final Office Action dated Feb. 2, 2021 in U.S. Appl. No. 16/666,809.
USPTO, Supplemental Notice of Allowance dated Mar. 2, 2021 in U.S. Appl. No. 16/453,593.
USPTO, Notice of Allowance dated Mar. 8, 2021 in U.S. Appl. No. 16/102,100.
USPTO, Decision on Appeal dated Apr. 5, 2021 in U.S. Appl. No. 15/076,348.
USPTO, Advisory Action dated Dec. 8, 2023 in U.S. Appl. No. 17/671,361.
USPTO, Final Office Action dated Jan. 25, 2024 in U.S. Appl. No. 17/079,239.
USPTO, Non-Final Office Action dated Jan. 16, 2024 in U.S. Appl. No. 17/527,423.
USPTO, Non-Final Office Action dated Feb. 1, 2024 in U.S. Appl. No. 17/671,361.
USPTO; Advisory Action dated Apr. 26, 2024 in U.S. Appl. No. 17/079,239.
USPTO; Notice of Allowance dated Apr. 19, 2024 in U.S. Appl. No. 17/527,423.
USPTO; Non-Final Office Action dated May 21, 2024 in U.S. Appl. No. 17/079,239.
USPTO; Non-Final Office Action dated Jun. 18, 2024 in U.S. Appl. No. 17/308,776.
USPTO; Final Office Action dated Jun. 27, 2024 in U.S. Appl. No. 17/671,361.
USPTO; Requirement for Restriction dated Jul. 17, 2024 in U.S. Appl. No. 17/747,816.
European Patent Office, European Search Report dated Sep. 4, 2024 in Application No. 24164789.0.
European Patent Office, European Search Report dated Aug. 27, 2024 in Application No. 24164939.1.
USPTO; Advisory Action dated Sep. 5, 2024 in U.S. Appl. No. 17/671,361.

(56)             References Cited

OTHER PUBLICATIONS

Tsung-Ming et al.: "On the Oxidation Kinetics and Mechanisms of Various SiC-Coated Carbon-Carbon Composites", Carbon, Elsevier Oxford, GB, vol. 29, No. 8, 1991, pp. 1257-1265, XP024029999, ISSN: 0008-6223, DOI: 10.1016/ 0008-6223(91)90045-K.
European Patent Office, European Office Action dated Aug. 27, 2024 in Application No. 1919130601014.
European Patent Office, European Search Report dated Aug. 27, 2024 in Application No. 24163857.6.
USPTO; Notice of Allowance dated Dec. 3, 2024 in U.S. Appl. No. 17/079,239.
USPTO; Non-Final Office Action dated Dec. 17, 2024 in U.S. Appl. No. 17/571,083.
USPTO; Non-Final Office Action dated Jan. 21, 2025 in U.S. Appl. No. 18/765,864.
USPTO; Notice of Allowance dated Oct. 2, 2025 in U.S. Appl. No. 18/186,821.
USPTO; Non-Final Office Action dated Aug. 5, 2025 in U.S. Appl. No. 18/186,844.
USPTO; Notice of Allowance dated Jul. 28, 2025 in U.S. Appl. No. 18/120,785.
USPTO; Requirement for Restriction/ Election dated Jul. 25, 2025 in U.S. Appl. No. 17/843,715.
USPTO; Notice of Allowance dated Oct. 22, 2025 in U.S. Appl. No. 18/186,821.
USPTO; Notice of Allowance dated Nov. 4, 2025 in U.S. Appl. No. 18/186,821.
European Patent Office, European Office Action dated Oct. 8, 2025 in Application No. 23156560.7.
USPTO; Notice of Allowance dated Oct. 21, 2025 in U.S. Appl. No. 17/843,715.
USPTO; Final Office Action dated Dec. 18, 2025 in U.S. Appl. No. 18/186,844.
USPTO; Notice of Allowance dated Jan. 22, 2026 in U.S. Appl. No. 18/186,821.
European Patent Office, European Office Action dated Jan. 14, 2026 in Application No. 19184523.9.

* cited by examiner

200

Pretreating a composite structure with a barrier coating ⟩ 205

Form boron slurry ⟩ 210

Apply boron slurry to composite structure ⟩ 220

Drying the composite structure ⟩ 225

Form silicon slurry ⟩ 230

Apply silicon slurry ⟩ 240

Drying the composite structure ⟩ 245

High temperature cure ⟩ 250

400

| Protective Layer<br>408 |
| :---: |
| Main Layer<br>406 |
| Barrier Layer<br>404 |
| Composite Structure<br>402 |

ADVANCED OXIDATION PROTECTION SYSTEM WITH BROAD TEMPERATURE RANGE CAPABILITY

FIELD

The present disclosure relates generally to composites and, more specifically, to oxidation protection systems for carbon-carbon composite structures.

BACKGROUND

Oxidation protection systems for carbon-carbon composites are typically designed to minimize loss of carbon material due to oxidation at high temperature operating conditions, which include temperatures of 427° C. (800° F.) or greater. Carbon-carbon composites have high specific strength, ranging from low to very high temperatures. However, carbon-carbon composites are intrinsically prone to oxidation in ambient environment to form carbon monoxide and carbon dioxide gases, losing mass and strength. An oxidation protection system (OPS) facilitates increased life cycles for carbon-carbon composite components, especially when used at high temperature applications.

OPS coatings protect C/C composites from oxidation damage through forming a barrier to block oxygen diffusion into the C/C substrate. In addition, an oxygen gettering phase is incorporated in the coating structure to remove $O_2$ molecules that diffused into the coating through fine cracks and defects.

Ceramic coatings are often brittle and have a limited operating temperature range over which the coating performs best. One coating may perform very well between 1000-1300 F, but May degrade quickly at higher temperatures, e.g., 1400-1800 F, whereas another coating system may perform well at 1400-1800 F, but not seal well at 800 F-1300 F.

SUMMARY

A method for forming an oxidation protection system on a carbon-carbon composite structure is disclosed herein. In various embodiments, the method comprises applying a boron slurry to the carbon-carbon composite structure, wherein the boron slurry comprises a boron compound, a first glass mixture, a first glass former, a first glass modifier, and a first carrier fluid, the first glass mixture including a first glass compound and a second glass compound, the first glass compound having a first viscosity-temperature profile that is at least one order of magnitude below a second viscosity-temperature profile of the second glass compound; applying a silicon slurry to the carbon-carbon composite structure, wherein the silicon slurry comprises a silicon compound, a third glass compound, a second glass former, a second glass modifier, and a second carrier fluid; and heating the carbon-carbon composite structure.

In various embodiments, the first viscosity-temperature profile is at least two orders of magnitude below the second viscosity-temperature profile of the second glass compound.

In various embodiments, the first glass compound has a first viscosity at 1,250° F. (677° C.) between $1.0\times10^4$ Pa·S and $1.0\times10^6$ Pa·S, and the second glass compound has a second viscosity at 1,250° F. (677° C.) between $5.0\times10^8$ Pa·S and $1.0\times10^{10}$ Pa·S. In various embodiments, the first glass compound has a third viscosity at 1,650° F. (899° C.) between $1.0\times10^1$ Pa·S and $1.0\times10^3$ Pa·S, and the second glass compound has a fourth viscosity at 1,650° F. (899° C.)

between $8.0\times10^4$ Pa·S and $8.0\times10^5$ Pa·S. In various embodiments, the first glass mixture comprises a fourth glass compound, the fourth glass compound has a fifth viscosity at 1,250° F. (677° C.) between $1.1\times10^6$ Pa·S and $9.9\times10^7$ Pa·S, and the fourth glass compound has a sixth viscosity at 1,650° F. (899° C.) between $1.0\times10^4$ Pa·S and $1.0\times10^6$ Pa·S.

In various embodiments the first glass compound includes a phosphate-based glass, and the second glass compound includes a first borosilicate glass. In various embodiments, the first glass mixture comprises a fourth glass compound, the fourth glass compound comprises a second borosilicate glass, and the second borosilicate glass has a different viscosity-temperature profile from the first borosilicate glass. In various embodiments, the first glass mixture includes approximately 20%±10 weight percent of the first glass compound, 30%±10 weight percent of the second glass compound and 50%±10 weight percent of the fourth glass compound.

In various embodiments, the first glass mixture further comprises a fourth glass compound, the fourth glass compound has a third viscosity-temperature profile that is between the first viscosity-temperature profile and the second viscosity-temperature profile, and the first glass mixture includes approximately 20%±10 weight percent of the first glass compound, 30%±10 weight percent of the second glass compound and 50%±10 weight percent of the fourth glass compound.

A method for forming an oxidation protection system on a brake disk is disclosed herein. In various embodiments, the method comprises forming a boron slurry by mixing a boron compound, a first glass mixture, a first glass former, a first glass modifier, and a first carrier fluid, the first glass mixture including a first glass compound and a second glass compound, the first glass compound having a first viscosity-temperature profile that is at least one order of magnitude below a second viscosity-temperature profile of the second glass compound; applying the boron slurry over a non-wear surface of the brake disk; forming a silicon slurry by mixing a silicon compound, a third glass compound, a second glass former, a second glass modifier, and a second carrier fluid; applying the silicon slurry over the non-wear surface of the brake disk; and heating the brake disk at a first temperature.

In various embodiments, the third glass compound is mixed with a fourth glass compound to form a second glass mixture prior to the forming the silicon slurry. In various embodiments, the first glass mixture is a same glass mixture as the second glass mixture.

In various embodiments, the first glass compound comprises a phosphate-based glass and the second glass compound comprises a borosilicate glass.

In various embodiments, the first glass mixture further comprises a fourth glass compound with a third viscosity-temperature profile that is between the first viscosity-temperature profile and the second viscosity-temperature profile.

An oxidation protection system disposed on an outer surface of a substrate is disclosed herein. The oxidation protection system comprises a boron-glass layer disposed over the outer surface, the boron-glass layer comprising a boron compound, a first glass mixture, a first glass former, and a first glass modifier, the boron-glass layer including a softening viscosity within a range of $1\times10^4$ Pa·S and $1\times10^9$ Pa·S for a temperature range between 1,000° F. (538° C.) and 1,800° F. (982° C.); and a silicon-glass layer disposed on the boron-glass layer.

In various embodiments, the silicon-glass layer comprises a silicon compound, a second glass mixture, a second glass former, and a second glass modifier, the second glass mixture including a same glass mixture as the first glass mixture.

In various embodiments, the first glass mixture includes a phosphate-based glass and a first borosilicate glass. In various embodiments, the first glass mixture includes a second borosilicate glass, and the first glass mixture includes approximately 20%±10 weight percent of the phosphate-based glass, 30%±10 weight percent of the first borosilicate glass and 50%±10 weight percent of the second borosilicate glass.

In various embodiments, the first glass mixture includes a first glass compound and a second glass compound, and wherein the first glass compound has a first viscosity-temperature profile that is at least one order of magnitude below a second viscosity-temperature profile of the second glass compound.

In various embodiments, the first glass mixture further comprises a third glass compound with a third viscosity-temperature profile between the first viscosity-temperature profile and the second-temperature profile.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not for limitation.

For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

Disclosed herein is an advanced OPS that has a broad temperature capability (i.e., 800° F. (427° C. to 1,800° F. (982° C.)) realized through design engineering of the building blocks of the coating system. By combining different types of glass as additives in the coating system, the OPS can effectively protect across a wide temperature range.

In various embodiments, the combination of phosphate glass, alkali, alkaline earth glass, borosilicate glass, $SiO_2$, SiOC, SiON glass, and high temperature glass can form an OPS coating that can seal fine cracks and defects on the coating at a wide temperature range from low temperature up to high temperature for different applications.

In various embodiments, the OPS can have multiple layers, with the barrier layer near the substrate providing a seal. An intermediate layer can be loaded with $O_2$ getter and a glass mixture that can provide a second seal and $O_2$ removal. A top layer can be more stable at higher temperatures, loaded with O2 getter and a glass mixture that softens at higher temperatures.

In various embodiments, the OPS coating can perform well in both a lower temperature range (800-1300 F) and a higher temperature range (1300-1800 F). In various embodiments, $O_2$ gettering phase consumption generates oxides that can dissolve into the glass matrix and locally seal the spot and prevent further O2 diffusion (self-healing). In various embodiments, protecting carbon/carbon composite components, as described herein, increases service life, reduces maintenance, repair, and operation (MRO) cost, reduces production cost, and/or reduces a carbon footprint.

Figure 1:
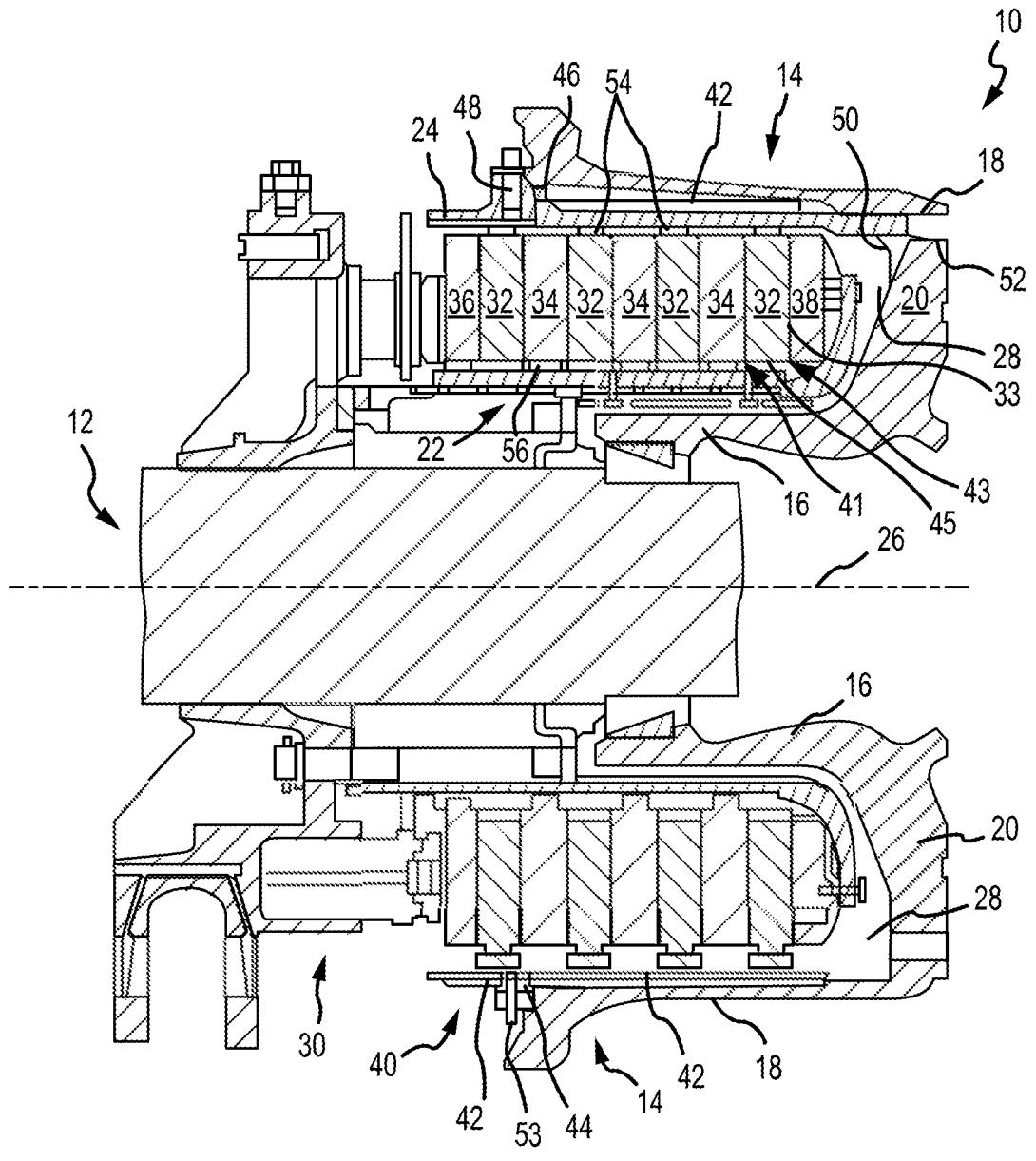
FIG. 1 illustrates a cross sectional view of an aircraft wheel braking assembly, in accordance with various embodiments.

With initial reference to FIG. 1, aircraft wheel brake assembly 10 such as may be found on an aircraft, in accordance with various embodiments is illustrated. Aircraft wheel brake assembly may, for example, comprise a bogie axle 12, a wheel including a hub 16 and a wheel well 18, a web 20, a torque take-out assembly 22, one or more torque bars 24, a wheel rotational axis 26, a wheel well recess 28, an actuator 30, multiple brake rotors 32, multiple brake stators 34, a pressure plate 36, an end plate 38, a heat shield 40, multiple heat shield sections 42, multiple heat shield carriers 44, an air gap 46, multiple torque bar bolts 48, a torque bar pin 50, a wheel web hole 52, multiple heat shield fasteners 53, multiple rotor lugs 54, and multiple stator slots 56.

Brake disks (e.g., interleaved rotors 32 and stators 34) are disposed in wheel well recess 28 of wheel well 18. Rotors 32 are secured to torque bars 24 for rotation with wheel 14, while stators 34 are engaged with torque take-out assembly 22. At least one actuator 30 is operable to compress interleaved rotors 32 and stators 34 for stopping the aircraft. In this example, actuator 30 is shown as a hydraulically actuated piston, but many types of actuators are suitable, such as an electromechanical actuator. Pressure plate 36 and end plate 38 are disposed at opposite axial ends of the interleaved rotors 32 and stators 34. Rotors 32 and stators 34 can comprise any material suitable for friction disks, including ceramics or carbon materials, such as a carbon/carbon composite.

Through compression of interleaved rotors 32 and stators 34 between pressure plates 36 and end plate 38, the resulting frictional contact slows rotation of wheel 14. Torque take-out assembly 22 is secured to a stationary portion of the landing gear truck such as a bogie beam or other landing gear strut, such that torque take-out assembly 22 and stators 34 are prevented from rotating during braking of the aircraft.

The friction disks (e.g., rotors 32, stators 34, pressure plate 36, end plate 38) may be formed of carbon-carbon (C/C) composites having carbon fibers disposed in a carbon matrix). The C/C composites may operate as heat sinks to absorb large amounts of kinetic energy converted to heat during slowing of the aircraft. Heat shield 40 may reflect thermal energy away from wheel well 18 and back toward rotors 32 and stators 34.

In various embodiments, brake disks of aircraft wheel brake assembly 10 may reach operating temperatures in the range from about 100° C. (212° F.) up to about 982° C. (1800° F.), or higher (e.g., 1093° C. (2000° F.)). The high temperatures experienced by aircraft wheel braking assembly 10 can lead to loss of C/C composite material due to oxidation of carbon. For example, various C/C composite components of aircraft wheel braking assembly 10 may experience both catalytic oxidation and inherent thermal oxidation caused by heating the composite during operation. In various embodiments, rotors 32 and stators 34 may be heated to sufficiently high temperatures that may oxidize the carbon surfaces exposed to air. At elevated temperatures, infiltration of air and contaminants may cause internal oxidation and weakening, especially in and around brake rotor lugs 54 or stator slots 56 securing the friction disks to the respective torque bar 24 and torque take-out assembly 22. Because C/C composite components of the aircraft wheel braking assembly 10 may retain heat for a substantial time period after slowing the aircraft, oxygen from the ambient atmosphere may react with the carbon matrix and/or carbon fibers to accelerate material loss. Further, damage to brake components may be caused by the oxidation enlargement of cracks around fibers or enlargement of cracks in barrier coating (e.g., a silicon-based barrier coating) applied to the C/C composite.

Elements identified in severely oxidized regions of C/C composite brake components include potassium (K) and sodium (Na). These alkali contaminants may come into contact with aircraft brakes as part of cleaning or de-icing materials. Other sources include salt deposits left from seawater or sea spray. These and other contaminants (e.g., Ca, Fe, etc.) can penetrate and leave deposits in pores of C/C composite aircraft brakes, including the substrate and any reaction-formed porous barrier coating. When such contamination occurs, the rate of carbon loss by oxidation can be increased by one to two orders of magnitude.

In various embodiments, an oxidation protection system, as disclosed herein, may be applied to the various components of aircraft wheel brake assembly 10 for protecting the components from oxidation. However, it will be recognized that the oxidation protection systems and methods of forming the same, as disclosed herein, may be readily adapted to many parts in this and other brake assemblies, as well as to other C/C composite structures susceptible to oxidation losses from infiltration of atmospheric oxygen and/or catalytic contaminants.

Figure 2:
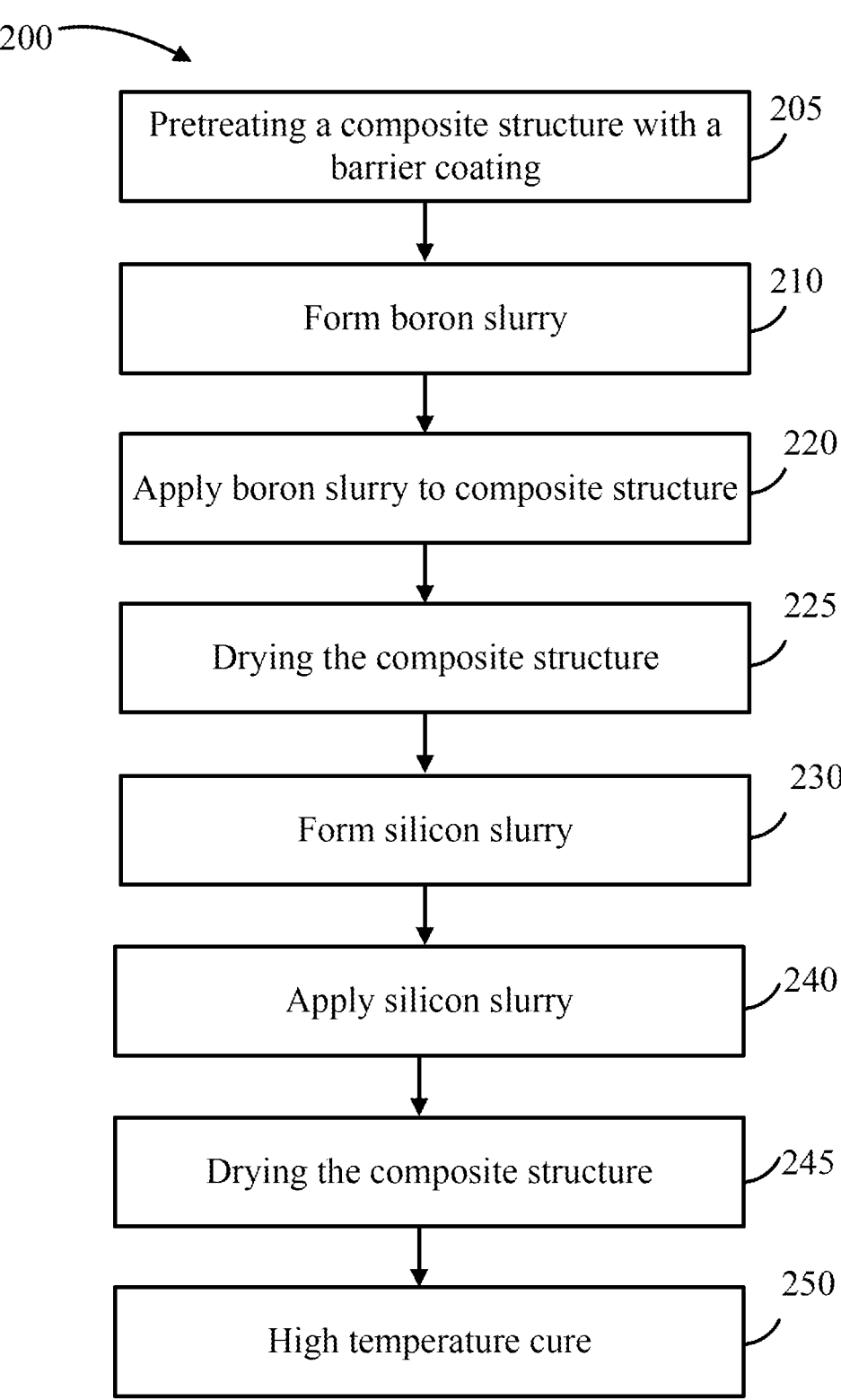
FIG. 2 illustrates a method for forming an oxidation protection system on a composite structure, in accordance with various embodiments.

In various embodiments, a method for limiting an oxidation reaction in a substrate (e.g., a C/C composite structure) may comprise forming an oxidation protection system on the composite structure. With reference to FIG. 2, a method 200 for forming an oxidation protection system on a composite structure is illustrated. In accordance with various embodiments, method 200 may, for example, comprise applying an oxidation inhibiting composition to non-wear surfaces of C/C composite brake components, such as non-wear surfaces 45 and/or lugs 54. Non-wear surface 45, as labeled in FIG. 1, simply references an exemplary non-wear surface on a brake disk, but non-wear surfaces similar to non-wear surface 45 may be present on any brake disks (e.g., rotors 32, stators 34, pressure plate 36, end plate 38, or the like). In various embodiments, method 200 may be used on the back face of pressure plate 36 and/or end plate 38, an inner diameter (ID) surface of stators 34 including slots 56, as well as an outer diameter (OD) surface of rotors 32 including lugs 54. Method 200 may be performed on densified C/C composites. In this regard, method 200 may be performed after carbonization and densification of the C/C composite.

In various embodiments, method 200 may comprise forming a boron slurry (step 210). The boron slurry may be formed by combining a boron compound, a glass mixture, a silica ($SiO_2$) glass former, and a glass modifier with a carrier fluid (such as, for example, water). In various embodiments, the boron compound may comprise at least one boron-comprising refractory material (e.g., ceramic material). In various embodiments, the boron compound may comprise boron carbide, titanium diboride, boron nitride, zirconium boride, silicon hexaboride, elemental boron, and/or mixtures thereof.

In various embodiments, the boron slurry may comprise from about 3% to about 30% by weight boron compound, from about 5% to about 20% by weight boron compound, or from about 7% to about 18% by weight boron compound. As used in previous context only, the term "about" means ±1.0 weight percent. In various embodiments, the boron slurry may comprise approximately 7.4% by weight boron compound. As used in this context only, the term "approximately" means ±0.50 weight percent. In various embodiments, the boron slurry may comprise approximately 16.7% by weight boron compound. As used in this context only, the term "approximately" means ±0.50 weight percent. In various embodiments, the boron slurry may comprise approximately 16.4% by weight boron compound. As used in this context only, the term "approximately" means ±0.50 weight percent.

In various embodiments, the boron compound comprises a mixture of boron carbide ($B_4C$) powder and boron nitride (BN) powder. In various embodiments, the boron nitride powder is comprised of cubic boron nitride (c-BN) powder. Cubic boron nitride may oxidize at a slower rate as compared to other boron compounds, such as hexagonal boron nitride, boron carbide, titanium boride, zirconium boride, calcium hexaboride, and others. By having a mixture of boron compounds with different oxidation rates, controlled oxidation at high temperatures in air may be established while having a replenishing boron source. Boron compounds are known to oxidize in high temperature environments, forming boron oxide, which liquefies and protects against further oxidation; however, inefficient conversion with SiO2 to form borosilicates can result in susceptibility to humid or wet environments, where the boron oxide may be lost as boric acid. Cubic boron nitride also provides a source of low CTE within the formulation nearest the carbon composite, reducing crack propagation during thermal events. In various embodiments, the boron nitride powder forms a greater weight percentage of the boron slurry as compared to the weight percentage formed by the boron carbide powder. In various embodiments, the boron carbide powder may form between about 1.0% and about 10.0% of the weight percentage of the boron slurry, and the boron nitride powder may form between about 5.0% and about 20.0% of the weight percentage of the boron slurry. In various embodiments, the boron carbide powder may form between about 1.0% and about 10.0% of the volume percentage of the boron slurry, and the boron nitride powder may form between about 5.0% and about 30.0% of the volume percentage of the boron slurry. As used in the previous context only, the term "about" means ±1.0 weight percent. In various embodiments, the boron carbide powder may form between about 4.0% and about 6.0% of the weight percentage of the boron slurry, and the boron nitride powder may form between about 10.0% and about 13.0% of the weight percentage of the boron slurry. As used in the previous context only, the term "about" means #1.0 weight percent. In various embodiments, the boron carbide powder may form between about 1% and about 2.5% of the weight percentage of the boron slurry, and the boron nitride powder may form between about 4.5% and about 6.5% of the weight percentage of the boron slurry. As used in this context only, the term "about" means ±1.0 weight percent.

In various embodiments, the boron compound is a powder (e.g., boron carbide powder, boron nitride powder, etc.). The boron compound powder may comprise particles having an average particle size of between about 100 nm and about 100 µm, between about 500 nm and about 50 µm, between about 1 µm and about 20 µm, between about 5 µm and about 10 µm, and/or between about 500 nm and about 1 µm. As used in the previous context only, the term "about" means ±10% of the associated value. In various embodiments, the boron compound powder may comprise particles having an average particle size of approximately 0.7 µm. As used in the previous context only, the term "approximately" means ±0.25 µm. In various embodiments, the boron compound powder may comprise particles having an average particle size of approximately 9.3 µm. As used in the previous context only, the term "approximately" means ±0.25 µm.

In various embodiments, the glass mixture of the boron slurry comprises at least two glass compounds. For example, the glass mixture can comprise a first glass compound and a second glass compound.

The glass mixture of the boron slurry may comprise at least two of the following glass compounds: a phosphate-based glass, an alkali glass, an alkaline earth glass, a borosilicate glass, a silicate glass (e.g., a $SiO_2$ based glass), an SiON glass, and/or a high-temperature melting point glass as described further herein. In various embodiments, the glass mixture of the boron slurry comprises a phosphate-based glass and a borosilicate glass. In various embodiments, the glass mixture comprises a phosphate-based glass, a first borosilicate glass, and a second borosilicate glass.

In various embodiments, a first glass compound in the glass mixture can comprise a viscosity temperature profile that is different from a second glass compound. In various embodiments, a viscosity at a first temperature of a first glass compound of the glass mixture is less than a viscosity at the first temperature of a second glass compound of the glass mixture by orders of magnitude. For example, a first glass compound can have a viscosity of approximately $1.0 \times 10^5$ Pa·S at 1,250° F. (677° C.) and a second glass compound can have a viscosity of approximately $1 \times 10^9$ Pa·S at 1,250° F. (677° C.). Similarly, the first glass compound can have a viscosity that is order of magnitudes less than the second glass compound at a second temperature. For example, the first glass compound of the glass mixture can have a viscosity at 1,650° F. (899° C.) of approximately $3.2 \times 10^2$ Pa·S and the second glass compound can have a viscosity at 1,650° F. (899° C.) of approximately $3.0 \times 10^5$ Pa·S.

In various embodiments, the first glass compound of the glass mixture includes a viscosity at 1,250° F. (677° C.) between $1.0 \times 10^4$ Pa·S and $1.0 \times 10^6$ Pa·S, or between $7.5 \times 10^4$ Pa·S and $2.5 \times 10^5$ Pa·S, or approximately $1.0 \times 10^5$ Pa·S. In various embodiments, the first glass compound can have a viscosity at 1,650° F. (899° C.) between $8.2 \times 10^1$ Pa·S and $8.2 \times 10^2$ Pa·S, or between $0.7 \times 10^2$ Pa·S and $5.7 \times 10^5$ Pa·S, or approximately $3.2 \times 10^2$ Pa·S.

In various embodiments, the second glass compound of the glass mixture includes a viscosity at 1,250° F. (677° C.) between $5.0 \times 10^8$ Pa·S and $1.0 \times 10^{10}$ Pa·S, or between $7.5 \times 10^8$ Pa·S and $2.5 \times 10^9$ Pa·S, or approximately $1.0 \times 10^9$ Pa·S. In various embodiments, the second glass compound can have a viscosity at 1,650° F. (899° C.) between $8.0 \times 10^4$ Pa·S and $8.0 \times 10^5$ Pa·S, or between $0.5 \times 10^5$ Pa·S and $5.5 \times 10^5$ Pa·S, or approximately $3.0 \times 10^5$ Pa·S.

In various embodiments, by having a first glass compound with a viscosity temperature profile with a significantly lower viscosity (i.e., at least two orders of magnitude) at various temperatures relative to a viscosity temperature profile of a second glass compound, a softening viscosity of a coating made from the glass mixture can be significantly broadened. For example, a softening viscosity of a coating made from the process described herein can be within the range of $1 \times 10^4$ and $1 \times 10^9$ Pa·S for a wide temperature range (e.g., between 1,000° F. (538° C.) and 1,800° F. (982° C.)) as described further herein.

In various embodiments, the glass mixture can comprise a third glass compound with a viscosity temperature profile that is between the first glass compound and the second glass compound. In various embodiments, the third glass compound of the glass mixture includes a viscosity at 1,250° F. (677° C.) between $1.1 \times 10^6$ Pa·S and $9.9 \times 10^7$ Pa·S, or between $0.6 \times 10^7$ Pa·S and $5.6 \times 10^7$ Pa·S, or approximately $3.1 \times 10^7$ Pa·S. In various embodiments, the third glass compound can have a viscosity at 1,650° F. (899° C.) between $1.0 \times 10^4$ Pa·S and $1.0 \times 10^6$ Pa·S, or between $7.5 \times 10^4$ Pa·S and $2.5 \times 10^5$ Pa·S, or approximately $1.0 \times 10^5$ Pa·S. In various embodiments, the third glass compound can comprise a viscosity of approximately $3.1 \times 10^7$ Pa·S at 1,250° F. (677° C.) and a viscosity of approximately $1.0 \times 10^5$ at 1,650° F. (899° C.).

Figure 3A:
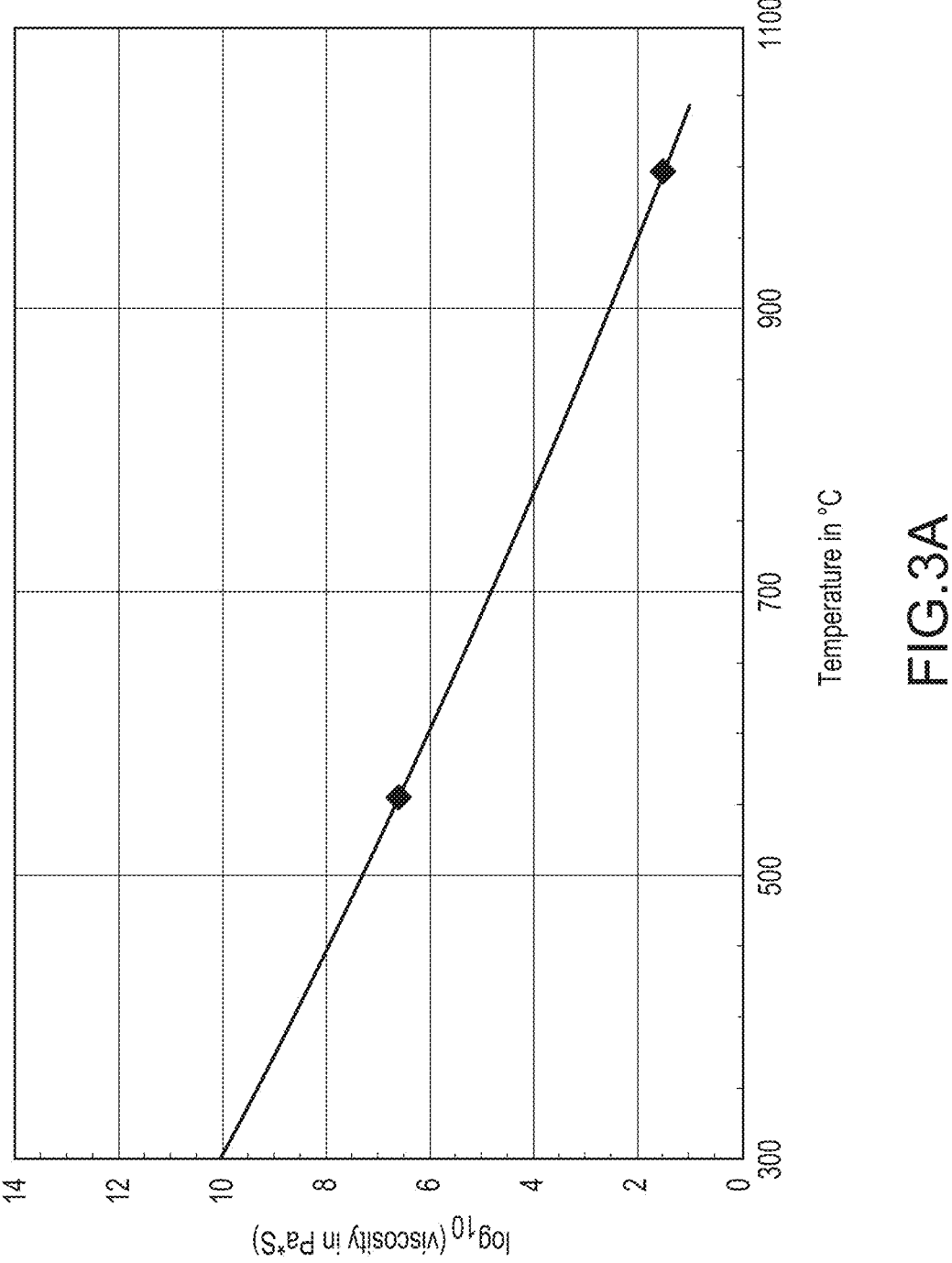
FIG. 3A illustrates a viscosity-temperature profile for a glass compound in a glass mixture of a sealing layer of an oxidation protection system, in accordance with various embodiments.
Figure 3B:
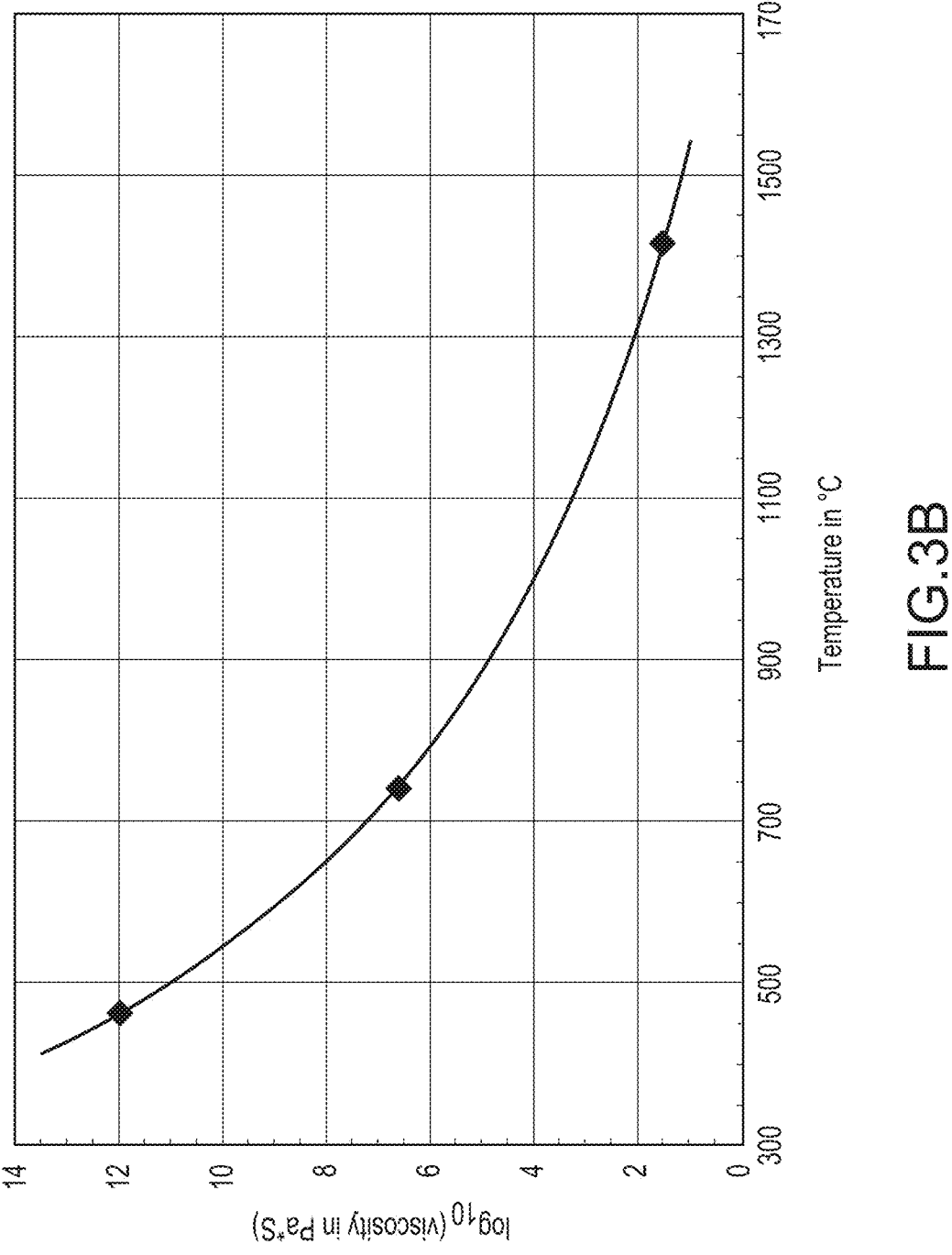
FIG. 3B illustrates a viscosity-temperature profile for a glass compound in a glass mixture of a sealing layer of an oxidation protection system, in accordance with various embodiments.
Figure 3C:
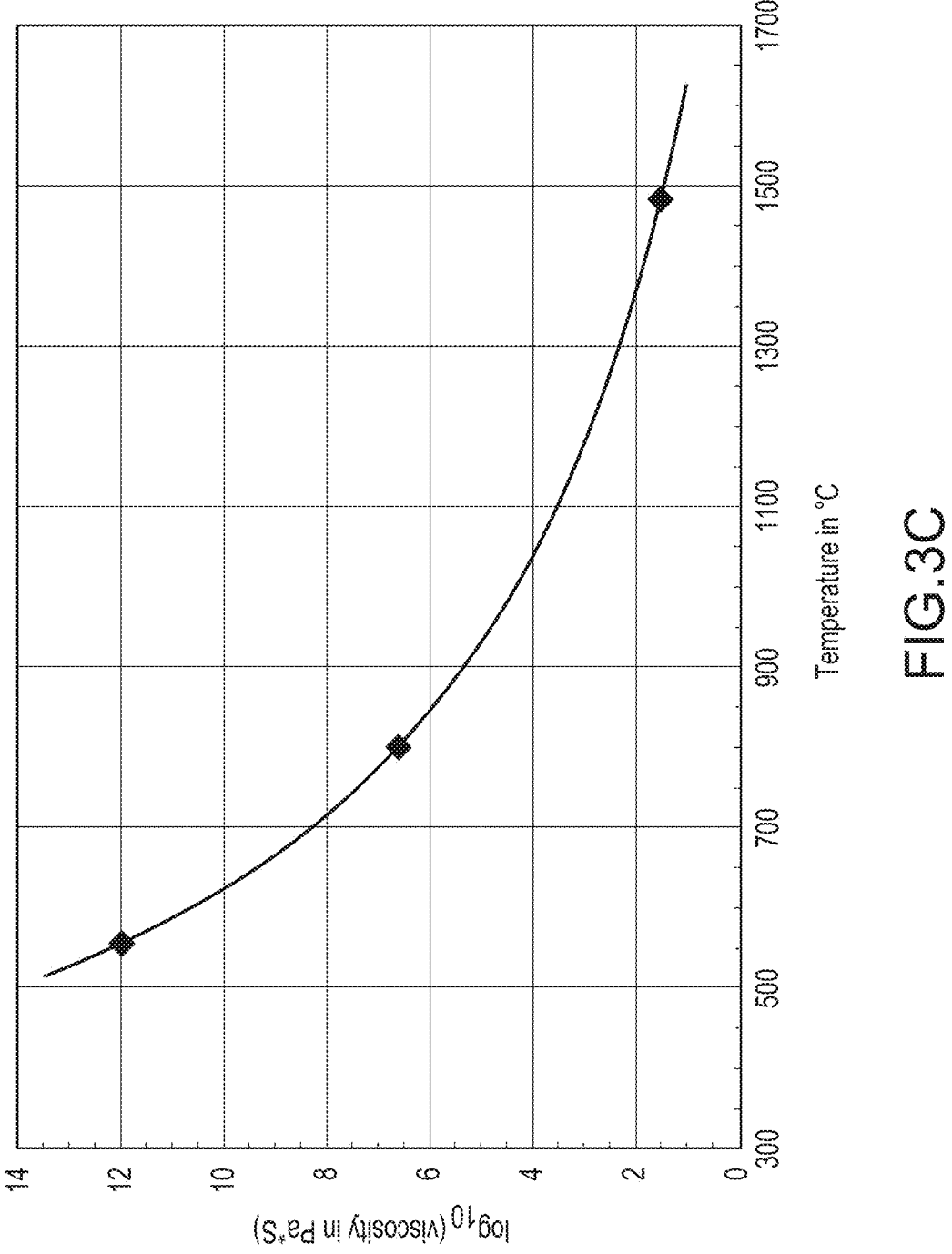
FIG. 3C illustrates a viscosity-temperature profile for a glass compound in a glass mixture of a sealing layer of an oxidation protection system, in accordance with various embodiments.

With brief reference to FIG. 3A-C, in various embodiments, the first glass compound can have a viscosity temperature profile in accordance with FIG. 3A, the second glass compound can have a viscosity temperature profile in accordance with FIG. 3C, and the third glass compound can have a viscosity temperature profile in accordance with FIG. 3B. Although described herein as comprising three glass compounds in the glass mixture, the present disclosure is not limited in this regard. For example, the glass mixture could include only two of the three glass compounds shown in FIGS. 3A-C, the glass mixture could include additional glass compounds, or the like.

In various embodiments, the first glass compound of the glass mixture comprises a phosphate-based glass. For example, the phosphate-based glass can comprise in mol percentage of the first glass compound, about 1.0% $SiO_2$, about 6.5% $B_2O_3$, about 0.8% $Al_2O_3$, about 12% MgO, about 3.5% BaO, about 20% $Li_2O$, about 0.1% F, and about 56% $P_2O_5$. As used in previous context only, the term "about" means ±1.0 mol percent. In various embodiments, the first glass compound may form approximately 20%±10 weight percent of the glass mixture.

In various embodiments, the second glass compound of the glass mixture comprises a first borosilicate glass. For example, the second glass compound can comprise, in mol percentage of the second glass compound, about 75% $SiO_2$, about 21% $B_2O_3$, about 2% $Al_2O_3$, and about 2% $Na_2O$. As used in previous context only, the term "about" means ±1.0 mol percent. In various embodiments, the second glass compound may form approximately 30%±10 weight percent of the glass mixture.

In various embodiments, the third glass compound of the glass mixture comprises a second borosilicate glass. For example, the third glass compound can comprise, in mol percentage of the third glass compound, about 61% $SiO_2$, about 27% $B_2O_3$, about 1% BaO, about 1% $Li_2O$, about 1% $Na_2O$, and about 0.5% $K_2O$. As used in previous context only, the term "about" means ±1.0 mol percent. In various embodiments, the second glass compound may form approximately 50%±20 weight percent of the glass mixture.

In various embodiments, a working point of the first glass compound is between 1450° F. (788° C.) and 1650° F. (899° C.), or approximately 1575° F. (857° C.). In various embodiments, a working point of the second glass compound is between 2,200° F. (1,204° C.) and 2,400° F. (1,316° C.), or approximately 2,285° F. (1,252° C.). In various embodiments, a working point of the third glass compound is between 1,950° F. (1,066° C.) and 2,150° F. (1,177° C.). "Working point" as referred to herein, is a temperature when a viscosity of the glass compound is $1.0 \times 10^3$ Pa·S.

In various embodiments, a weight percentage of the glass mixture in the boron slurry may be between about 5.0% and about 50.0%, between about 10.0% and about 35.0%, between about 24.0% and about 26.0%, or between about 27.0% and about 29.0%. As used in previous context only, the term "about" means ±1.0 weight percent. In various embodiments, the glass mixture may form approximately 25.0% of the weight percentage of the boron slurry. As used in the previous context only, the term "approximately" means ±0.50 weight percent.

In various embodiments, the silica glass former may include colloidal silica, metal silicates, alkyl silicates, and/or amorphous or crystalline silica. In various embodiments, the silica glass former is a colloidal silica suspension having 40.0% by weight silica. In various embodiments, the silica glass former may be silicon (Si) powder. The silica glass former may form between about 10.0% and about 40.0%, between about 20.0% and about 30.0%, or between about 24.0% and about 28.0% of the weight percentage of the boron slurry. As used the previous context only, the term "about" means ±1.0 weight percent. In various embodiments, the silica glass former may form approximately 25.0% of the weight percentage of the boron slurry. As used the previous context only, the term "approximately" means ±0.5 weight percent.

In various embodiments, the boron slurry may also comprise a glass modifier. The glass modifier may include an alkaline earth metal compound such as, for example, calcium boride ($CaB_6$), calcium oxide (CaO), calcium carbonate ($Ca(CO_3)_2$), magnesium boride ($MgB_2$), magnesium oxide (MgO), magnesium carbonate ($Mg(CO_3)_2$), a zirconium compound such as, for example, zirconium boride ($ZrB_2$), zirconium oxide ($ZrO_2$), zirconium carbonate ($Zr(CO_3)_2$), and/or an aluminum compound such as aluminum oxide ($Al_2O_3$). The glass modifier reacts with the glass mixture and refractory oxides that may form during oxidation, thereby resulting in a more stable and/or denser glass ceramic coating at associated temperature range. In various embodiments, the glass modifier may form between about 0.5% and about 10.0%, between about 1.0% and about 5.0%, between about 3.0% and about 4.0%, or between about 1.0% and about 2.0% of the weight percentage of the boron slurry.

In various embodiments, the boron slurry may also comprise monoaluminium phosphate. The monoaluminium phosphate may be in the form of a solution (e.g., monoaluminium phosphate and a carrier fluid) of any suitable make-up. In various embodiments, the monoaluminium phosphate solution may comprise about 50% by weight monoaluminium phosphate and about 50% by weight carrier fluid (e.g., water). In the previous context only, the term "about" means ±10.0 weight percent. In various embodiments, the monoaluminium phosphate solution may form between about 1.0% and about 10.0%, between about 2.0% and about 5.0%, or between about 3.0% and about 4.0% of the weight percentage of the boron slurry. As used the previous context only, the term "about" means ±1.0 weight percent.

In various embodiments, the boron slurry may comprise, in weight percentage, about 5.0% boron carbide powder, about 12.0% boron nitride powder, about 25.0% glass mixture, about 3.0% monoaluminium phosphate solution, about 25.0% colloidal silica suspension, about 2.0% aluminum oxide, and about 28.0% water. As used the previous context only, the term "about" means ±1.0 weight percent. The glass mixture may comprise, in weight percentage, approximately 20%±10 weight percent of the first glass compound, 30%±10 weight percent of the second glass compound and 50%±10 weight percent of the third glass compound described previously herein. The colloidal silica suspension may be 40% by weight silica. The monoaluminium phosphate solution may be 50% by weight monoaluminium phosphate and 50% by weight carrier fluid. The colloidal silica suspension may be 40% by weight silica.

In various embodiments, the boron slurry may comprise, in weight percentage, about 2.0% boron carbide powder, about 6.0% boron nitride powder, about 28.0% glass mixture, about 4.0% monoaluminium phosphate solution, about 28.0% colloidal silica suspension, about 2.0% aluminum oxide, and about 31.0% water. As used the previous context only, the term "about" means ±1.0 weight percent. The glass mixture may comprise, in weight percentage, approximately 20%±10 weight percent of the first glass compound, 30%±10 weight percent of the second glass compound and 50%±10 weight percent of the third glass compound described previously herein. The colloidal silica suspension may be 40% by weight silica. The monoaluminium phosphate solution may be 50% by weight monoaluminium phosphate and 50% by weight carrier fluid. The colloidal silica suspension may be 40% by weight silica.

In various embodiments, the boron slurry may comprise, in weight percentage of the boron slurry, about 5.0% boron carbide powder, about 12.0% boron nitride powder, about 25.0% glass mixture, about 3.0% monoaluminium phosphate solution, about 25.0% colloidal silica suspension, about 3.0% calcium carbonate, and about 28.0% water. As used the previous context only, the term "about" means ±1.0 weight percent. The glass mixture may comprise, in weight percentage, approximately 20%±10 weight percent of the first glass compound, 30%±10 weight percent of the second glass compound and 50%±10 weight percent of the third glass compound described previously herein. The colloidal silica suspension may be 40% by weight silica. The monoaluminium phosphate solution may be 50% by weight monoaluminium phosphate and 50% by weight carrier fluid. The colloidal silica suspension may be 40% by weight silica.

In accordance with various embodiments, method 200 further comprises applying the boron slurry to a composite structure (step 220). Applying the boron slurry may comprise, for example, spraying or brushing the boron slurry to an outer surface of the composite structure. Any suitable manner of applying the boron slurry to the composite structure is within the scope of the present disclosure. As referenced herein, the composite structure may refer to a C/C composite structure. In accordance with various embodiments, the boron slurry may be applied directly on (i.e., in physical contact with) the surface of the composite structure. In various embodiments, the boron slurry is applied to a barrier layer as described further herein. The present disclosure is not limited in this regard.

With continued reference to FIG. 2, in various embodiments, method 200 may further include drying the composite structure after applying the boron slurry (step 225). Step 225 may be performed prior to applying the silicon slurry (i.e., prior to step 240). Step 225 may include heating the composite structure at a relatively low temperature (for example, a temperature of between about 150° F. (66° C.) and about 500° F. (260° C.), or of about 400° F. (204° C.) to remove the carrier fluid of the boron slurry. In the previous context only, the term "about" means ±25° F. (14° C.)). Step 225 may include heating the composite structure for about 5 minutes to about 8 hours, about 10 minutes to about 2 hours, or about 20 minutes, wherein the term "about" in this context only means ±10% of the associated value.

In various embodiments, method 200 may comprise forming a silicon slurry (step 230) by combining a silicon compound, a glass mixture (or a glass compound), a silica glass former compound, and a glass modifier with a carrier fluid (such as, for example, water). In various embodiments, the silicon compound may comprise at least one silicon-comprising refractory material (e.g., ceramic material). In various embodiments, the silicon compound may comprise silicon carbide, a silicide compound, silicon, silicon dioxide, silicon carbonitride, or combinations thereof.

In various embodiments, the silicon slurry may comprise from about 5.0% to about 30.0% by weight silicon compound, from about 10.0% to about 20.0% by weight silicon compound, from about 9.0% to about 11.0% by weight silicon compound, or from about 18.0% to about 20.0% by weight silicon compound. As used in previous context only, the term "about" means ±1.0 weight percent.

In various embodiments, the silicon compound is a powder (e.g., silicon powder or silicon carbide powder). The silicon compound powder may comprise particles having an average particle size of between about 100 nm and 50 µm, between 500 nm and 20 µm, between 500 nm and 1.5 µm, or between 16 µm and 18 µm. As used in previous context only, the term "about" means ±1.0 µm. In various embodiments, the silicon compound may comprise particles having an average particle size of approximately 17 µm. As used in the previous context only, the term "about" means ±0.25 µm. In various embodiments, the silicon compound may comprise particles having an average particle size of approximately 1.0 µm. As used in the previous context only, the term "about" means ±0.25 µm.

A glass mixture of the silicon slurry may comprise the same glass mixture of the boron slurry described previously herein. In various embodiments, the glass mixture of the silicon slurry may comprise a similar glass mixture of the boron slurry described previously herein (e.g., at least two glass compounds). In various embodiments, the silicon slurry may comprise a single glass compound instead of a glass mixture. In this regard, the silicon slurry can comprise only a borosilicate glass, borophosphate, quartz, aluminosilicate, boroaluminosilicate, a phosphate-based glass or any other suitable glass, and be within the scope of this disclosure. The glass mixture may be in the form of a glass frit or other pulverized form. In various embodiments, the glass compound is borosilicate glass. In various embodiments, the borosilicate glass may comprise in weight percentage 13% $B_2O_3$, 61% $SiO_2$, 2% $Al_2O_3$, and 4% $Na_2O$, and may have a CTE of $3.3 \times 10^{-6}$ cm/C, a working point of 2286° F. (1252° C.), and an annealing point of 1040° F. (560° C.). In various embodiments, the silicon slurry may comprise between about 5.0% and about 50.0% by weight glass mixture (or glass compound), between about 10.0% and about 30.0% by weight glass mixture (or glass compound), between about 22% and about 24% by weight glass mixture (or glass compound), or between about 24.0% and about 26.0% by weight glass mixture (or glass compound). As used in previous context only, the term "about" means ±1.0 weight percent.

In various embodiments, the silica glass former may include colloidal silica, metal silicates, alkyl silicates, and/or elemental silica. In various embodiments, the silica glass former is a colloidal silica suspension having 40.0% by weight silica. In various embodiments, the silica glass former may be silicon powder. The silica glass former may form between about 10.0% and about 40.0%, between about 20.0% and about 30.0%, between about 22.0% and about 24.0%, or between about 24.0% and 26.0% of the weight percentage of the silicon slurry. As used the previous context only, the term "about" means ±1.0 weight percent.

In various embodiments, the silicon slurry may also comprise monoaluminium phosphate. The monoaluminium phosphate may be in the form of a solution (e.g., monoaluminium phosphate and a carrier fluid) of any suitable make-up. In various embodiments, the monoaluminium phosphate solution may comprise about 50% by weight monoaluminium phosphate and about 50% by weight carrier fluid (e.g., water). In the previous context only, the term "about" means ±10 weight percent. In various embodiments, the monoaluminium phosphate solution may form between about 1% and about 10%, between about 2% and about 5%, or between about 3% and about 4% of the weight percentage of the silicon slurry. As used the previous context only, the term "about" means ±1.0 weight percent.

In various embodiments, the silicon slurry may also comprise a glass modifier. The glass modifier may include an alkaline earth metal compound such as, for example, calcium boride ($CaB_6$), calcium oxide (CaO), calcium carbonate ($Ca(CO_3)_2$), magnesium boride ($MgB_2$), magnesium oxide (MgO), magnesium carbonate ($Mg(CO_3)_2$), a zirconium compound such as, for example, zirconium boride ($ZrB_2$), zirconium oxide (ZrO), zirconium carbonate ($Zr(CO_3)_2$), and/or an aluminum compound such as aluminum oxide ($Al_2O_3$). The glass modifier reacts with the glass compound (or glass mixture) and refractory oxides that may form during oxidation, thereby resulting in a more stable and/or denser glass ceramic coating at associated temperature range. In various embodiments, the glass modifier may form between about 1.0% and about 15.0%, between about 3.0% and about 10.0%, or between about 5.0% and about 7.0% of the weight percentage of the silicon slurry. As used the previous context only, the term "about" means ±1.0 weight percent.

In various embodiments, the silicon slurry may comprise, in weight percentage, about 19.0% silicon carbide powder, about 23.0% glass compound (or glass mixture), about 3.0% monoaluminium phosphate solution, about 23.0% colloidal silica suspension, about 6.0% zirconium boride, and about 27.0% water. As used the previous context only, the term "about" means ±1.0 weight percent. In various embodiments, the glass compound of the silicon slurry comprises borosilicate glass that includes in weight percentage 13%

$B_2O_3$, 81% $SiO_2$, 2% $Al_2O_3$, and 4% $Na_2O$, and may have a CTE of 3.3×10–6 cm/C, a working point of 2286° F. (1252° C.), and an annealing point of 1040° F. (560° C.). In various embodiments, the glass mixture of the silicon slurry comprises approximately 20%±10 weight percent of the first glass compound, 30%±10 weight percent of the second glass compound and 50%±10 weight percent of the third glass compound described previously herein. The colloidal silica suspension may be 40% by weight silica. The monoaluminium phosphate solution may be 50% by weight monoaluminium phosphate and 50% by weight carrier fluid.

In various embodiments, the silicon slurry may comprise, in weight percentage, about 10.0% silicon carbide powder, about 25.0% glass compound (or glass mixture), about 3.0% monoaluminium phosphate solution, about 25.0% colloidal silica suspension, about 7.0% zirconium boride, and about 29.0% water. As used the previous context only, the term "about" means ±1.0 weight percent. The colloidal silica suspension may be 40% by weight silica. The monoaluminium phosphate solution may be 50% by weight monoaluminium phosphate and 50% by weight carrier fluid.

In various embodiments, the silicon slurry may comprise, in weight percentage, about 18.0% silicon carbide powder, about 23.0% glass compound (or glass mixture), about 3.0% monoaluminium phosphate solution, about 23.0% colloidal silica suspension, about 7.0% zirconium boride, and about 26.0% water. As used the previous context only, the term "about" means ±1.0 weight percent. The colloidal silica suspension may be 40% by weight silica. The monoaluminium phosphate solution may be 50% by weight monoaluminium phosphate and 50% by weight carrier fluid.

In various embodiments, method 200 further comprises applying the silicon slurry to the composite structure (step 240). Applying the silicon slurry may comprise, for example, spraying or brushing the silicon slurry over the surface on which the boron slurry was applied (e.g., the silicon slurry is applied over the boron slurry). Any suitable manner of applying the silicon slurry to the composite structure is within the scope of the present disclosure. As referenced herein, the composite structure may refer to a C/C composite structure.

In various embodiments, method 200 may further comprise drying the composite structure after applying the silicon slurry (step 245). Step 245 may include heating the composite structure at a relatively low temperature (for example, a temperature of between about 150° F. (66° C.) and about 500° F. (260° C.), or of about 200° F. (93° C.) to remove the carrier fluid of the silicon slurry. Step 245 may include heating the composite structure for about 5 minutes to about 8 hours, about 10 minutes to about 2 hours, or about 10 minutes, wherein the term "about" in this context only means ±10% of the associated value.

In various embodiments, method 200 may further comprise performing a high temperature cure (step 250) to form a boron-glass layer on the composite structure and a silicon-glass layer on the boron-glass layer. Step 250 may include heating the composite structure at a relatively high temperature, for example, a temperature of between 1200° F. (649° C.) to about 2000° F. (1093° C.), between about 1500° F. (816° C.) to about 1700° F. (927° C.), or about 1650° F. (899° C.), wherein the term "about" in previous context only means ±25° F. (±14° C.)). Step 250 may include heating the composite structure for about 5 minutes to about 8 hours, about 30 minutes to about 5 hours, or about 2 hours, wherein the term "about" in this context only means ±10% of the associated value. In various embodiments, step 250 may be performed in an inert environment, such as under a blanket of inert or less reactive gas (e.g., nitrogen ($N_2$), argon, other noble gases, and the like). The temperature rise may be controlled at a rate that removes water without boiling and provides temperature uniformity throughout the composite structure.

In various embodiments method 200, may further comprise applying at least one of a pretreating composition or a barrier coating (step 205) prior to applying the first slurry. Step 205 may, for example, comprise applying a first pretreating composition to an outer surface of a composite structure, such as a component of aircraft wheel braking assembly 10. In various embodiments, the first pretreating composition comprises an aluminum oxide in water. For example, the aluminum oxide may comprise an additive, such as a nanoparticle dispersion of aluminum oxide (for example, NanoBYK-3600® sold by BYK Additives & Instruments). The first pretreating composition may further comprise a surfactant or a wetting agent. The composite structure may be porous, allowing the pretreating composition to penetrate at least a portion of the pores of the composite structure.

In various embodiments, after applying the first pretreating composition, the component may be heated to remove water and fix the aluminum oxide in place. For example, the component may be heated between about 100° C. (212° F.) and 200° C. (392° F.), and further, between 100° C. (212° F.) and 150° C. (302° F.).

In various embodiments, the pretreatment composition may comprise monoaluminium phosphate. The monoaluminium phosphate may be in the form of a solution (e.g., monoaluminium phosphate and a carrier fluid) of any suitable make-up. In various embodiments, the monoaluminium phosphate solution may comprise about 50% by weight monoaluminium phosphate and about 50% by weight carrier fluid (e.g., water). In the previous context only, the term "about" means ±10 weight percent. In various embodiments, after applying the pretreatment composition, the composite structure is heated to remove carrier fluid and fix the monoaluminium phosphate over the composite structure. In accordance with various embodiments, method 300 may include applying the boron slurry (step 220) after heating the composite structure to remove the carrier fluid (e.g., water) of the pretreatment composition.

Step 205 may further comprise applying a second pretreating composition. In various embodiments, the second pretreating composition comprises a phosphoric acid and an aluminum phosphate, aluminum hydroxide, and/or aluminum oxide. The second pretreating composition may further comprise, for example, a second metal salt such as a magnesium salt. In various embodiments, the aluminum to phosphorus molar ratio of the aluminum phosphate is 1 to 3 or less by weight. Further, the second pretreating composition may also comprise a surfactant or a wetting agent. In various embodiments, the second pretreating composition is applied to the composite structure atop the first pretreating composition. The composite structure may then, for example, be heated. In various embodiments, the composite structure may be heated between about 600° C. (1112° F.) and about 800° C. (1472° F.), and further, between about 650° C. (1202° F.) and 750° C. (1382° F.).

Not to be bound by theory, it is believed that boron components may become oxidized during service at high temperatures, thereby forming boron oxide. The boron oxide may come into contact with the silica glass former or oxidized silicon components to form a borosilicate in situ, providing a method of self-healing. For a boron-silicon oxidation protection system, the probability of boron oxide reacting with oxidized silicon compounds is kinetically controlled and influenced by the amount of each component, surface area, aspect ratio, etc. Boron oxide is also volatile, especially when hydrated to form boric acid, and may be lost during extended service time. Method 200 tends to increase the probability of self-healing borosilicate formation by creating a layer of silicon, glass, and glass former over the boron-glass layer that can reduce boron oxide transportation in water prior to volatilization. For instance, by adding cubic boron nitride, which oxidizes much slower than other boron compounds below 1000 C, the amount of the boron oxide production may be reduced. A balance of the cubic boron nitride along with the boron carbide is needed to get both good oxidation protection and stability in water. Boron compounds are known to oxidize in high temperature environments, forming boron oxide, which liquefies and protects against further oxidation; however, inefficient conversion with $SiO_2$ to form borosilicates can result in susceptibility to humid or wet environments, where the boron oxide may be lost as boric acid. Cubic boron nitride also provides a source of low CTE within the formulation nearest the carbon composite, reducing the formation of crack propagation during thermal events. The silica glass former in the boron-glass layer and in the silicon-glass layer may also react with the boron oxide forming, for example, borosilicate glass, laminboard glass, borophosphate glass, etc. in the boron-glass and/or silicon-glass layers. The silica reacting with the boron oxide, tends to decrease or eliminate unreacted boron oxide, thereby increasing the water stability of the oxidation protection system.

Figure 4:
FIG. 4 illustrates a carbon-carbon composite structure with an oxidation protection system, in accordance with various embodiments, in accordance with various embodiments.

Referring now to FIG. 4, an oxidation protection system 400 of a composite structure 402 (e.g., a C/C composite structure as described previously herein). In various embodiments, the oxidation protection system 400 is formed via method 200 described previously herein. For example, the barrier layer 404 can be at least partially formed by step 205 described previously herein, the main layer 406 can be at least partially formed by steps 210, 220, 225 of method 200, and the protective layer 408 can be at least partially formed by steps 230, 240, 245, and the oxidation protection system 400 can be formed by step 250.

In various embodiments, the oxidation protection system 400 disclosed herein facilitates enhanced oxidation performance across a broad temperature range. For example, the oxidation protection system 400 is configured to generate a C/C coupon weight loss after 24 hours of less than 2% at 1,250° F. (677° C.) and 1,600° F. (871° C.), in accordance with various embodiments. In various embodiments, the oxidation protection system 400 is configured to generate a C/C coupon weight loss after 24 hours of less than 1%. For example, with reference to FIG. 1, below, oxidation performance of various oxidation protection systems are shown.

In various embodiments, the glass mixtures of OPS 400-1, 400-2, 400-3 are various percentages, by weight, of the first glass compound, the second glass compound, and/or the third glass compound as described previously herein.

TABLE I

Performance Data for Oxidation Protection System 400

| Sample ID | Glass (Main Layer) | C/C coupons weight loss after 24 hrs at 1250 F. | C/C coupon weight loss after 10 hrs at 1600 F. |
|---|---|---|---|
| | Phosphate Glass based | 0.60% | 23% |
| | Borosilicate Glass based | 3.80% | 4.50% |

TABLE I-continued

Performance Data for Oxidation Protection System 400

| Sample ID | Glass (Main Layer) | C/C coupons weight loss after 24 hrs at 1250 F. | C/C coupon weight loss after 10 hrs at 1600 F. |
|---|---|---|---|
| OPS 400-1 | Glass Mixture | 1.40% | 1.60% |
| OPS 400-2 | Glass Mixture | 1.10% | 1.60% |
| OPS 400-3 | Glass Mixture | 0.80% | 0.60% |

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for forming an oxidation protection system on a carbon-carbon composite structure, comprising:

applying a boron slurry to the carbon-carbon composite structure, wherein the boron slurry comprises a boron compound, a first glass mixture, a first glass former, a first glass modifier, and a first carrier fluid, the first glass mixture including a first glass compound and a second glass compound, the first glass compound having a first viscosity-temperature profile that is at least one order of magnitude below a second viscosity-temperature profile of the second glass compound, wherein the first glass compound includes a first viscosity at 1,250° F. (677° C.) between $1.0 \times 10^4$ Pa·S and $1.0 \times 10^6$ Pa·S, and wherein the second glass compound includes a second viscosity at 1,250° F. (677° C.) between $1.0 \times 10^8$ Pa·S and $1.0 \times 10^{10}$ Pa·S;

applying a silicon slurry to the carbon-carbon composite structure, wherein the silicon slurry comprises a silicon compound, a third glass compound, a second glass former, a second glass modifier, and a second carrier fluid; and heating the carbon-carbon composite structure.

2. The method of claim 1, wherein the first viscosity-temperature profile is at least two orders of magnitude below the second viscosity-temperature profile of the second glass compound.

3. The method of claim 1, wherein:

the first glass compound includes a third viscosity at 1,650° F. (899° C.) between $1.0 \times 10^1$ Pa·S and $1.0 \times 10^3$ Pa·S, and the second glass compound includes a fourth viscosity at 1,650° F. (899° C.) between $8.0 \times 10^4$ Pa·S and $8.0 \times 10^6$ Pa·S.

4. The method of claim 3, wherein:

the first glass mixture comprises a fourth glass compound, the fourth glass compound includes a fifth viscosity at 1,250° F. (677° C.) between $1.1 \times 10^6$ Pa·S and $9.9 \times 10^7$ Pa·S, and the fourth glass compound includes a sixth viscosity at 1,650° F. (899° C.) between $1.0 \times 10^4$ Pa·S and $1.0 \times 10^6$ Pa·S.

5. The method of claim 1, wherein:

the first glass compound includes a phosphate-based glass, and the second glass compound includes a first borosilicate glass.

6. The method of claim 5, wherein:

the first glass mixture comprises a fourth glass compound, the fourth glass compound comprises a second borosilicate glass, and the second borosilicate glass has a different viscosity-temperature profile from the first borosilicate glass.

7. The method of claim 6, wherein the first glass mixture includes approximately 20%±10 weight percent of the first glass compound, 30%±10 weight percent of the second glass compound and 50%±10 weight percent of the fourth glass compound.

8. The method of claim 1, wherein:

the first glass mixture further comprises a fourth glass compound, the fourth glass compound has a third viscosity-temperature profile that is between the first viscosity-temperature profile and the second viscosity-temperature profile, and the first glass mixture includes approximately 20%±10 weight percent of the first glass compound, 30%±10 weight percent of the second glass compound and 50%±10 weight percent of the fourth glass compound.

* * * * *